United States Patent
Zhou et al.

(10) Patent No.: US 9,619,349 B2
(45) Date of Patent: Apr. 11, 2017

(54) BIASING ACTIVE-STANDBY DETERMINATION

(71) Applicant: Brocade Communications Systems, Inc., San Jose, CA (US)

(72) Inventors: Bill Jianqiang Zhou, Milpitas, CA (US); William R. Mahoney, Campbell, CA (US)

(73) Assignee: Brocade Communications Systems, Inc., San Jose, CA (US)

(*) Notice: Subject to any disclaimer, the term of this patent is extended or adjusted under 35 U.S.C. 154(b) by 212 days.

(21) Appl. No.: 14/514,253

(22) Filed: Oct. 14, 2014

(65) Prior Publication Data

US 2016/0103745 A1    Apr. 14, 2016

(51) Int. Cl.
*G06F 11/20* (2006.01)
*G06F 11/14* (2006.01)
(Continued)

(52) U.S. Cl.
CPC ...... *G06F 11/2033* (2013.01); *G06F 11/0724* (2013.01); *G06F 11/1417* (2013.01);
(Continued)

(58) Field of Classification Search
None
See application file for complete search history.

(56) References Cited

U.S. PATENT DOCUMENTS

| 5,159,592 A | 10/1992 | Perkins |
| 5,278,986 A | 1/1994 | Jourdenais et al. |

(Continued)

FOREIGN PATENT DOCUMENTS

| EP | 0887731 A1 | 12/1998 |
| EP | 0926859 A | 6/1999 |

(Continued)

OTHER PUBLICATIONS

"GIGAswitch FDDI System—Manager's Guide," Part No. EK-GGMGA-MG.B01, Jun. 1993 first printing, Apr. 1995 second printing, Copyright 1995, 113 pages, Digital Equipment Corporation, Maynard, MA.

(Continued)

*Primary Examiner* — Albert Decady
*Assistant Examiner* — Paul Contino
(74) *Attorney, Agent, or Firm* — Kilpatrick Townsend & Stockton LLP

(57) ABSTRACT

In computing systems that provide multiple computing domains configured to operate according to an active-standby model, techniques are provided for intentionally biasing the race to gain mastership between competing computing domains, which determines which computing domain operates in the active mode, in favor of a particular computer domain. The race to gain mastership may be biased in favor of a computing domain operating in a particular mode prior to the occurrence of the event that triggered the race to gain mastership. For example, in certain embodiments, the race to mastership may be biased in favor of the computing domain that was operating in the active mode prior to the occurrence of an event that triggered the race to gain mastership.

21 Claims, 8 Drawing Sheets

(51) Int. Cl.
  *G06F 11/07* (2006.01)
  *G06F 11/18* (2006.01)
  *G06F 11/16* (2006.01)

(52) U.S. Cl.
  CPC ...... *G06F 11/1441* (2013.01); *G06F 11/1658* (2013.01); *G06F 11/184* (2013.01); *G06F 11/202* (2013.01); *G06F 11/2023* (2013.01); *G06F 11/2094* (2013.01); *G06F 2201/805* (2013.01)

(56) References Cited

U.S. PATENT DOCUMENTS

| | | | |
|---|---|---|---|
| 5,410,710 A | 4/1995 | Sarangdhar et al. | |
| 5,473,599 A * | 12/1995 | Li | G06F 11/2005 370/219 |
| 5,550,816 A | 8/1996 | Hardwick et al. | |
| 5,550,973 A * | 8/1996 | Forman | G11C 29/74 714/10 |
| 5,553,230 A * | 9/1996 | Petersen | G06F 11/006 714/1 |
| 5,649,110 A | 7/1997 | Ben-Nun et al. | |
| 5,701,502 A | 12/1997 | Baker et al. | |
| 5,732,209 A | 3/1998 | Vigil et al. | |
| 5,828,578 A | 10/1998 | Blomgren | |
| 5,878,232 A | 3/1999 | Marimuthu | |
| 5,878,264 A | 3/1999 | Ebrahim | |
| 5,970,232 A | 10/1999 | Passint et al. | |
| 5,978,578 A | 11/1999 | Azarya et al. | |
| 6,047,330 A | 4/2000 | Stracke, Jr. | |
| 6,097,718 A | 8/2000 | Bion | |
| 6,101,188 A | 8/2000 | Sekine et al. | |
| 6,104,700 A | 8/2000 | Haddock et al. | |
| 6,111,888 A | 8/2000 | Green et al. | |
| 6,115,393 A | 9/2000 | Engel et al. | |
| 6,119,200 A | 9/2000 | George | |
| 6,161,169 A | 12/2000 | Cheng | |
| 6,233,236 B1 | 5/2001 | Nelson et al. | |
| 6,269,391 B1 | 7/2001 | Gillespie | |
| 6,282,678 B1 | 8/2001 | Snay et al. | |
| 6,331,983 B1 | 12/2001 | Haggerty et al. | |
| 6,374,292 B1 | 4/2002 | Srivastava et al. | |
| 6,397,242 B1 | 5/2002 | Devine et al. | |
| 6,424,629 B1 | 7/2002 | Rubino et al. | |
| 6,430,609 B1 | 8/2002 | Dewhurst et al. | |
| 6,442,682 B1 | 8/2002 | Pothapragada et al. | |
| 6,496,510 B1 | 12/2002 | Tsukakoshi et al. | |
| 6,496,847 B1 | 12/2002 | Bugnion et al. | |
| 6,526,054 B1 | 2/2003 | Li et al. | |
| 6,567,417 B2 | 5/2003 | Kalkunte et al. | |
| 6,570,875 B1 | 5/2003 | Hegde | |
| 6,577,634 B1 | 6/2003 | Tsukakoshi et al. | |
| 6,580,727 B1 | 6/2003 | Yim et al. | |
| 6,587,469 B1 | 7/2003 | Bragg | |
| 6,597,699 B1 | 7/2003 | Ayres | |
| 6,604,146 B1 | 8/2003 | Rempe et al. | |
| 6,608,819 B1 | 8/2003 | Mitchem et al. | |
| 6,633,916 B2 | 10/2003 | Kauffman | |
| 6,636,895 B1 | 10/2003 | Li et al. | |
| 6,674,756 B1 | 1/2004 | Rao et al. | |
| 6,675,218 B1 | 1/2004 | Mahler et al. | |
| 6,678,248 B1 | 1/2004 | Haddock et al. | |
| 6,680,904 B1 | 1/2004 | Kaplan et al. | |
| 6,683,850 B1 | 1/2004 | Dunning et al. | |
| 6,691,146 B1 | 2/2004 | Armstrong et al. | |
| 6,704,925 B1 | 3/2004 | Bugnion | |
| 6,711,357 B1 | 3/2004 | Brewer et al. | |
| 6,711,672 B1 | 3/2004 | Agesen | |
| 6,725,289 B1 | 4/2004 | Waldspurger et al. | |
| 6,731,601 B1 | 5/2004 | Krishna et al. | |
| 6,732,220 B2 | 5/2004 | Babaian et al. | |
| 6,763,023 B1 | 7/2004 | Gleeson et al. | |
| 6,785,886 B1 | 8/2004 | Lim et al. | |
| 6,789,156 B1 | 9/2004 | Waldspurger | |
| 6,791,980 B1 | 9/2004 | Li | |
| 6,795,966 B1 | 9/2004 | Lim et al. | |
| 6,847,638 B1 | 1/2005 | Wu | |
| 6,854,054 B1 | 2/2005 | Kavanagh | |
| 6,859,438 B2 | 2/2005 | Haddock et al. | |
| 6,879,559 B1 | 4/2005 | Blackmon et al. | |
| 6,880,022 B1 | 4/2005 | Waldspurger et al. | |
| 6,894,970 B1 | 5/2005 | McDermott, III et al. | |
| 6,898,189 B1 | 5/2005 | Di Benedetto et al. | |
| 6,910,148 B1 | 6/2005 | Ho et al. | |
| 6,938,179 B2 | 8/2005 | Iyer et al. | |
| 6,944,699 B1 | 9/2005 | Bugnion et al. | |
| 6,961,806 B1 | 11/2005 | Agesen et al. | |
| 6,961,941 B1 | 11/2005 | Nelson et al. | |
| 6,975,587 B1 | 12/2005 | Adamski et al. | |
| 6,975,639 B1 | 12/2005 | Hill et al. | |
| 6,983,294 B2 * | 1/2006 | Jones | G06F 11/1658 |
| 7,039,720 B2 | 5/2006 | Alfieri et al. | |
| 7,058,010 B2 | 6/2006 | Chidambaran et al. | |
| 7,061,858 B1 | 6/2006 | Di Benedetto et al. | |
| 7,065,059 B1 | 6/2006 | Zinin | |
| 7,065,079 B1 | 6/2006 | Patra et al. | |
| 7,080,283 B1 | 7/2006 | Songer et al. | |
| 7,093,160 B2 | 8/2006 | Lau et al. | |
| 7,133,399 B1 | 11/2006 | Brewer et al. | |
| 7,188,237 B2 | 3/2007 | Zhou et al. | |
| 7,194,652 B2 | 3/2007 | Zhou et al. | |
| 7,236,453 B2 | 6/2007 | Visser et al. | |
| 7,269,133 B2 | 9/2007 | Lu et al. | |
| 7,284,236 B2 | 10/2007 | Zhou et al. | |
| 7,292,535 B2 | 11/2007 | Folkes et al. | |
| 7,305,492 B2 | 12/2007 | Bryers et al. | |
| 7,308,503 B2 | 12/2007 | Giraud et al. | |
| 7,315,552 B2 | 1/2008 | Kalkunte et al. | |
| 7,317,722 B2 | 1/2008 | Aquino et al. | |
| 7,324,500 B1 | 1/2008 | Blackmon et al. | |
| 7,327,671 B2 | 2/2008 | Karino et al. | |
| 7,339,903 B2 | 3/2008 | O'Neill | |
| 7,360,084 B1 | 4/2008 | Hardjono | |
| 7,362,700 B2 | 4/2008 | Frick et al. | |
| 7,382,736 B2 | 6/2008 | Mitchem et al. | |
| 7,385,977 B2 | 6/2008 | Wu et al. | |
| 7,392,424 B2 * | 6/2008 | Ho | H04L 45/00 714/4.4 |
| 7,404,006 B1 | 7/2008 | Slaughter et al. | |
| 7,406,037 B2 | 7/2008 | Okita | |
| 7,417,947 B1 | 8/2008 | Marques et al. | |
| 7,417,990 B2 | 8/2008 | Ikeda et al. | |
| 7,418,439 B2 | 8/2008 | Wong | |
| 7,424,014 B2 | 9/2008 | Mattes et al. | |
| 7,441,017 B2 | 10/2008 | Watson et al. | |
| 7,444,422 B1 | 10/2008 | Li | |
| 7,447,225 B2 | 11/2008 | Windisch et al. | |
| 7,483,370 B1 | 1/2009 | Dayal et al. | |
| 7,483,433 B2 | 1/2009 | Simmons et al. | |
| 7,487,277 B2 * | 2/2009 | Rinaldi | G06F 9/524 710/200 |
| 7,503,039 B2 | 3/2009 | Inoue et al. | |
| 7,518,986 B1 | 4/2009 | Chadalavada et al. | |
| 7,522,521 B2 | 4/2009 | Bettink et al. | |
| 7,529,981 B2 | 5/2009 | Childress et al. | |
| 7,533,254 B2 | 5/2009 | Dybsetter et al. | |
| 7,535,826 B1 | 5/2009 | Cole et al. | |
| 7,599,284 B1 | 10/2009 | Di Benedetto et al. | |
| 7,609,617 B2 | 10/2009 | Appanna et al. | |
| 7,613,183 B1 | 11/2009 | Brewer et al. | |
| 7,620,953 B1 | 11/2009 | Tene et al. | |
| 7,631,066 B1 * | 12/2009 | Schatz | G06F 9/5016 709/224 |
| 7,652,982 B1 | 1/2010 | Kovummal | |
| 7,656,409 B2 | 2/2010 | Cool et al. | |
| 7,664,020 B2 | 2/2010 | Luss | |
| 7,694,298 B2 | 4/2010 | Goud et al. | |
| 7,720,066 B2 | 5/2010 | Weyman et al. | |
| 7,729,296 B1 | 6/2010 | Choudhary | |
| 7,739,360 B2 | 6/2010 | Watson et al. | |
| 7,751,311 B2 | 7/2010 | Ramaiah et al. | |
| 7,787,360 B2 | 8/2010 | Windisch et al. | |
| 7,787,365 B1 | 8/2010 | Marques et al. | |
| 7,788,381 B2 | 8/2010 | Watson et al. | |

(56) References Cited

U.S. PATENT DOCUMENTS

| | | |
|---|---|---|
| 7,802,073 B1 | 9/2010 | Cheng et al. |
| 7,804,769 B1 | 9/2010 | Tuplur et al. |
| 7,804,770 B2 | 9/2010 | Ng |
| 7,805,516 B2 | 9/2010 | Kettler et al. |
| 7,830,802 B2 | 11/2010 | Huang et al. |
| 7,830,895 B2 | 11/2010 | Endo et al. |
| 7,843,920 B2 | 11/2010 | Karino et al. |
| 7,843,930 B2 | 11/2010 | Mattes et al. |
| 7,873,776 B2 | 1/2011 | Hetherington et al. |
| 7,886,195 B2 | 2/2011 | Mayer |
| 7,894,334 B2 | 2/2011 | Wen et al. |
| 7,898,937 B2* | 3/2011 | O'Toole .............. G06F 11/1425 370/216 |
| 7,929,424 B2 | 4/2011 | Kochhar et al. |
| 7,940,650 B1 | 5/2011 | Sandhir et al. |
| 7,944,811 B2 | 5/2011 | Windisch et al. |
| 7,974,315 B2 | 7/2011 | Yan et al. |
| 8,009,671 B2 | 8/2011 | Guo et al. |
| 8,014,394 B2 | 9/2011 | Ram |
| 8,028,290 B2 | 9/2011 | Rymarczyk et al. |
| 8,040,884 B2 | 10/2011 | Arunachalam et al. |
| 8,074,110 B2 | 12/2011 | Vera et al. |
| 8,086,906 B2 | 12/2011 | Ritz et al. |
| 8,089,964 B2 | 1/2012 | Lo et al. |
| 8,095,691 B2 | 1/2012 | Verdoorn, Jr. et al. |
| 8,099,625 B1 | 1/2012 | Tseng et al. |
| 8,102,848 B1 | 1/2012 | Rao |
| 8,121,025 B2 | 2/2012 | Duan et al. |
| 8,131,833 B2 | 3/2012 | Hadas et al. |
| 8,149,691 B1 | 4/2012 | Chadalavada et al. |
| 8,156,230 B2 | 4/2012 | Bakke et al. |
| 8,161,260 B2 | 4/2012 | Srinivasan |
| 8,180,923 B2 | 5/2012 | Smith et al. |
| 8,181,174 B2 | 5/2012 | Liu |
| 8,289,912 B2 | 10/2012 | Huang |
| 8,291,430 B2 | 10/2012 | Anand et al. |
| 8,335,219 B2 | 12/2012 | Simmons et al. |
| 8,341,625 B2 | 12/2012 | Ferris et al. |
| 8,345,536 B1 | 1/2013 | Rao et al. |
| 8,406,125 B2 | 3/2013 | Dholakia et al. |
| 8,495,418 B2* | 7/2013 | Abraham .............. G06F 11/00 714/10 |
| 8,503,289 B2 | 8/2013 | Dholakia et al. |
| 8,576,703 B2 | 11/2013 | Dholakia et al. |
| 8,599,754 B2 | 12/2013 | Li |
| 8,607,110 B1 | 12/2013 | Peng et al. |
| 8,769,155 B2 | 7/2014 | Nagappan et al. |
| 8,776,050 B2 | 7/2014 | Plouffe et al. |
| 9,094,221 B2 | 7/2015 | Dholakia et al. |
| 9,104,619 B2 | 8/2015 | Chin et al. |
| 9,137,671 B2 | 9/2015 | Fahldieck |
| 2002/0002640 A1 | 1/2002 | Barry |
| 2002/0013802 A1 | 1/2002 | Mori et al. |
| 2002/0035641 A1 | 3/2002 | Kurose et al. |
| 2002/0103921 A1 | 8/2002 | Nair et al. |
| 2002/0129166 A1 | 9/2002 | Baxter et al. |
| 2002/0150094 A1 | 10/2002 | Cheng et al. |
| 2003/0084161 A1 | 5/2003 | Watson et al. |
| 2003/0105794 A1 | 6/2003 | Jasinschi et al. |
| 2003/0202520 A1 | 10/2003 | Witkowski et al. |
| 2004/0001485 A1 | 1/2004 | Frick et al. |
| 2004/0030766 A1 | 2/2004 | Witkowski |
| 2004/0078625 A1 | 4/2004 | Rampuria et al. |
| 2005/0028028 A1 | 2/2005 | Jibbe |
| 2005/0036485 A1 | 2/2005 | Eilers et al. |
| 2005/0055598 A1 | 3/2005 | Chen et al. |
| 2005/0114846 A1 | 5/2005 | Banks et al. |
| 2005/0147028 A1* | 7/2005 | Na .................. H04L 45/00 370/217 |
| 2005/0149633 A1 | 7/2005 | Natarajan et al. |
| 2005/0213498 A1 | 9/2005 | Appanna et al. |
| 2006/0002343 A1 | 1/2006 | Nain et al. |
| 2006/0004942 A1 | 1/2006 | Hetherington et al. |
| 2006/0018253 A1 | 1/2006 | Windisch et al. |
| 2006/0018333 A1 | 1/2006 | Windisch et al. |
| 2006/0090136 A1 | 4/2006 | Miller et al. |
| 2006/0136913 A1 | 6/2006 | Sameske |
| 2006/0143617 A1 | 6/2006 | Knauerhase et al. |
| 2006/0171404 A1 | 8/2006 | Nalawade et al. |
| 2006/0176804 A1 | 8/2006 | Shibata |
| 2006/0184349 A1 | 8/2006 | Goud et al. |
| 2006/0184938 A1 | 8/2006 | Mangold |
| 2006/0190766 A1* | 8/2006 | Adler .................. G06F 11/2025 714/13 |
| 2006/0212677 A1* | 9/2006 | Fossum .................. G06F 1/3237 712/1 |
| 2006/0224826 A1 | 10/2006 | Arai et al. |
| 2006/0274649 A1 | 12/2006 | Scholl |
| 2006/0294211 A1 | 12/2006 | Amato |
| 2007/0027976 A1 | 2/2007 | Sasame et al. |
| 2007/0036178 A1 | 2/2007 | Hares et al. |
| 2007/0076594 A1 | 4/2007 | Khan et al. |
| 2007/0083687 A1* | 4/2007 | Rinaldi .................. G06F 9/524 710/200 |
| 2007/0162565 A1 | 7/2007 | Hanselmann |
| 2007/0169084 A1 | 7/2007 | Frank et al. |
| 2007/0174309 A1 | 7/2007 | Pettovello |
| 2007/0189213 A1 | 8/2007 | Karino et al. |
| 2008/0022410 A1 | 1/2008 | Diehl |
| 2008/0068986 A1 | 3/2008 | Maranhao et al. |
| 2008/0082810 A1 | 4/2008 | Cepulis et al. |
| 2008/0120518 A1 | 5/2008 | Ritz et al. |
| 2008/0137528 A1* | 6/2008 | O'Toole .............. G06F 11/1425 370/216 |
| 2008/0159325 A1 | 7/2008 | Chen et al. |
| 2008/0165681 A1 | 7/2008 | Huang et al. |
| 2008/0165750 A1 | 7/2008 | Kim |
| 2008/0189468 A1 | 8/2008 | Schmidt et al. |
| 2008/0201603 A1 | 8/2008 | Ritz et al. |
| 2008/0212584 A1 | 9/2008 | Breslau et al. |
| 2008/0222633 A1 | 9/2008 | Kami |
| 2008/0225859 A1 | 9/2008 | Mitchem |
| 2008/0243773 A1 | 10/2008 | Patel et al. |
| 2008/0244222 A1 | 10/2008 | Supalov et al. |
| 2008/0250266 A1 | 10/2008 | Desai et al. |
| 2009/0028044 A1 | 1/2009 | Windisch et al. |
| 2009/0031166 A1 | 1/2009 | Kathail et al. |
| 2009/0036152 A1 | 2/2009 | Janneteau et al. |
| 2009/0037585 A1 | 2/2009 | Miloushev et al. |
| 2009/0049537 A1 | 2/2009 | Chen et al. |
| 2009/0051492 A1 | 2/2009 | Diaz et al. |
| 2009/0054045 A1 | 2/2009 | Zakrzewski et al. |
| 2009/0055831 A1 | 2/2009 | Bauman et al. |
| 2009/0059888 A1* | 3/2009 | Nelson ................ G06F 11/1492 370/346 |
| 2009/0080428 A1 | 3/2009 | Witkowski et al. |
| 2009/0086622 A1 | 4/2009 | Ng |
| 2009/0092135 A1 | 4/2009 | Simmons et al. |
| 2009/0094481 A1 | 4/2009 | Vera et al. |
| 2009/0106409 A1 | 4/2009 | Murata |
| 2009/0144579 A1 | 6/2009 | Swanson |
| 2009/0185506 A1 | 7/2009 | Watson et al. |
| 2009/0186494 A1* | 7/2009 | Bell, Jr. .............. G06F 13/409 439/65 |
| 2009/0193280 A1* | 7/2009 | Brooks .............. G06F 11/1474 713/400 |
| 2009/0198766 A1 | 8/2009 | Chen et al. |
| 2009/0216863 A1 | 8/2009 | Gebhart et al. |
| 2009/0219807 A1 | 9/2009 | Wang |
| 2009/0245248 A1 | 10/2009 | Arberg et al. |
| 2009/0316573 A1 | 12/2009 | Lai |
| 2010/0017643 A1 | 1/2010 | Baba et al. |
| 2010/0039932 A1 | 2/2010 | Wen et al. |
| 2010/0042715 A1* | 2/2010 | Tham .................. G06F 11/2025 709/224 |
| 2010/0058342 A1 | 3/2010 | Machida |
| 2010/0064293 A1 | 3/2010 | Kang et al. |
| 2010/0107162 A1 | 4/2010 | Edwards et al. |
| 2010/0138208 A1 | 6/2010 | Hattori et al. |
| 2010/0138830 A1 | 6/2010 | Astete et al. |
| 2010/0169253 A1 | 7/2010 | Tan |
| 2010/0235662 A1 | 9/2010 | Nishtala |
| 2010/0257269 A1 | 10/2010 | Clark |

(56) References Cited

U.S. PATENT DOCUMENTS

| | | |
|---|---|---|
| 2010/0278091 A1 | 11/2010 | Sung et al. |
| 2010/0287548 A1 | 11/2010 | Zhou et al. |
| 2010/0325381 A1 | 12/2010 | Heim |
| 2010/0325485 A1 | 12/2010 | Kamath et al. |
| 2011/0010709 A1 | 1/2011 | Anand et al. |
| 2011/0023028 A1 | 1/2011 | Nandagopal et al. |
| 2011/0029969 A1 | 2/2011 | Venkataraja et al. |
| 2011/0072327 A1 | 3/2011 | Schoppmeier et al. |
| 2011/0125949 A1 | 5/2011 | Mudigonda et al. |
| 2011/0126196 A1 | 5/2011 | Cheung et al. |
| 2011/0154331 A1 | 6/2011 | Ciano et al. |
| 2011/0173334 A1 | 7/2011 | Shah |
| 2011/0228770 A1 | 9/2011 | Dholakia et al. |
| 2011/0228771 A1 | 9/2011 | Dholakia et al. |
| 2011/0228772 A1 | 9/2011 | Dholakia et al. |
| 2011/0228773 A1 | 9/2011 | Dholakia et al. |
| 2011/0231578 A1 | 9/2011 | Nagappan et al. |
| 2012/0023309 A1 | 1/2012 | Abraham et al. |
| 2012/0023319 A1 | 1/2012 | Chin et al. |
| 2012/0030237 A1 | 2/2012 | Tanaka |
| 2012/0158995 A1 | 6/2012 | McNamee et al. |
| 2012/0166764 A1* | 6/2012 | Henry ............... G06F 9/5094 712/43 |
| 2012/0174097 A1 | 7/2012 | Levin |
| 2012/0230240 A1 | 9/2012 | Nebat et al. |
| 2012/0290869 A1 | 11/2012 | Heitz |
| 2012/0297236 A1 | 11/2012 | Ziskind et al. |
| 2013/0013905 A1* | 1/2013 | Held ................. G06F 21/575 713/2 |
| 2013/0070766 A1 | 3/2013 | Pudiyapura |
| 2013/0211552 A1 | 8/2013 | Gomez et al. |
| 2013/0259039 A1 | 10/2013 | Dholakia et al. |
| 2013/0263117 A1 | 10/2013 | Konik et al. |
| 2014/0007097 A1 | 1/2014 | Chin et al. |
| 2014/0029613 A1 | 1/2014 | Dholakia et al. |
| 2014/0036915 A1 | 2/2014 | Dholakia et al. |
| 2014/0068103 A1 | 3/2014 | Gyambavantha et al. |
| 2014/0089425 A1 | 3/2014 | Chin et al. |
| 2014/0089484 A1 | 3/2014 | Chin et al. |
| 2014/0095927 A1 | 4/2014 | Abraham et al. |
| 2014/0143591 A1* | 5/2014 | Chiang ............ H04L 41/0654 714/4.11 |
| 2015/0039932 A1* | 2/2015 | Kaufmann .......... G06F 11/201 714/6.2 |
| 2016/0092324 A1* | 3/2016 | Young ............... G06F 11/2028 714/4.11 |
| 2016/0105390 A1* | 4/2016 | Bernstein .......... H04L 61/1535 709/220 |
| 2016/0182241 A1 | 6/2016 | Chin et al. |

FOREIGN PATENT DOCUMENTS

| | | |
|---|---|---|
| EP | 1107511 A2 | 6/2001 |
| EP | 1 939 742 A2 | 2/2008 |
| EP | 2 084 605 A2 | 8/2009 |
| WO | WO 2008/054997 A2 | 5/2008 |
| WO | WO 2014/004312 A1 | 1/2014 |

OTHER PUBLICATIONS

"GIGAswitch System—Manager's Guide," Part No. EK-GGMGA-MG.A01, Jun. 1993, Copyright 1993, 237 pages, Digital Equipment Corporation, Maynard, MA.
"Brocade ServerIron ADX 1000, 4000, and 8000 Series Frequently Asked Questions," 10 pages, Copyright 2009, Brocade Communications Systems, Inc.
Braden et al., "Integrated Services in the Internet Architecture: an Overview," Jul. 1994, RFC 1633, Network Working Group, pp. 1-28.
Burke, "Vmware Counters Oracle, Microsoft With Free Update", Nov. 13, 2007, 2 pages.
Chen, "New Paradigm in Application Delivery Networking: Advanced Core Operating System (ACOS) and Multi-CPU Architecture—They Key to Achieving Availability, Scalability and Performance." White Paper, May 2009, 5 pages, A10 Networks.
Cisco IP Routing Handbook, Copyright 2000, 24 pages, M&T Books.
Cisco Systems, Inc., "BGP Support for Nonstop Routing (NSR) with Stateful Switchover (SSO)." Mar. 20, 2006, 18 pages.
Cisco Systems, Inc., "Graceful Restart, Non Stop Routing and IGP routing protocol timer Manipulation," Copyright 2008, 4 pages.
Cisco Systems, Inc., "Intermediate System-to-Intermediate System (IS-IS) Support for Graceful Restart (GR) and Non-Stop Routing (NSR)," Copyright 2008, pp. 1-3.
Cisco Systems, Inc., "Internet Protocol Multicast," Internetworking Technologies Handbook, 3rd Edition, Published 2000, Chapter 43, 16 pages.
Cisco Systems, Inc., "Multicast Quick—Start Configuration Guide," Document ID:9356, Copyright 2008-2009, 15 pages.
Cisco Systems, Inc., "Warm Reload," Cisco IOS Releases 12.3(2)T, 12.2(18)S, and 12.2(27)SBC, Copyright 2003, 14 pages.
Demers et al., "Analysis and Simulation of a Fair Queueing Algorithm," Xerox PARC, Copyright 1989, 12 pages, ACM.
Fenner, et al., "Protocol Independent Multicast—Sparse Mode (PIM-SM): Protocol Specification (Revised)." Network Working Group, RFC 4601, Aug. 2006, pp. 1-151.
Floyd et al., "Link-sharing and Resource Management Models for Packet Networks," IEEE/ACM Transactions on Networking, Aug. 1995, vol. 3, No. 4, Copyright 1995, IEEE, 22 pages.
Freescale Semiconductor, Inc., "Freescale's Embedded Hypervisor for QorIQ™ P4 Series Communications Platform," White Paper, Oct. 2008, Copyright 2008, 8 pages, Document No. EMHYPQIQTP4CPWP, Rev. 1.
Freescale Semiconductor, Inc., "Embedded Multicore: An Introduction," Jul. 2009, Copyright 2009, 73 pages, Document No. EMBMCRM, Rev. 0.
Hardwick, "IP Multicast Explained," Metaswitch Networks, Jun. 2004, 71 pages.
Hemminger, "Delivering Advanced Application Acceleration & Security," Application Delivery Challenge, Jul. 2007, 3 pages.
Intel® Virtualization Technology, Product Brief, "Virtualization 2.0—Moving Beyond Consolidation", 2008, 4 pages.
IP Infusion Brochure, "ZebOS® Network Platform: Transporting You to Next Generation Networks," ip infusion™ An Access Company, Jun. 2008, 6 pages.
Kaashok et al., "An Efficient Reliable Broadcast Protocol," Operating System Review, Oct. 4, 1989, 15 pages.
Kakadia, et al., "Enterprise Network Design Patterns: High Availability" Sun Microsystems, Inc., Sun BluePrints™ Online, Revision A, Nov. 26, 2003, 37 pages, at URL: http://www.sun.com/blueprints.
Kaplan, "Part 3 in the Reliability Series: NSR™ Non-Stop Routing Technology," White Paper, Avici Systems, Copyright 2002, 8 pages.
Keshav, "An Engineering Approach to Computer Networking: ATM Networks; the internet, and the Telephone Network," Addison-Wesley Professional Computing Series, part 1 of 5, May 15, 1997, Copyright 1997, 148 pages, by AT&T, Addison-Wesley Publishing Company.
Keshav, "An Engineering Approach to Computer Networking: ATM Networks; the internet, and the Telephone Network," Addison-Wesley Professional Computing Series, part 2 of 5, May 15, 1997, Copyright 1997, 131 pages, by AT&T, Addison-Wesley Publishing Company.
Keshav, "An Engineering Approach to Computer Networking: ATM Networks; the internet, and the Telephone Network," Addison-Wesley Professional Computing Series, part 3 of 5, May 15, 1997, Copyright 1997, 129 pages, by AT&T, Addison-Wesley Publishing Company.
Keshav, "An Engineering Approach to Computer Networking: ATM Networks; the internet, and the Telephone Network," Addison-Wesley Professional Computing Series, part 4 of 5, May 15, 1997, Copyright 1997, 130 pages, by AT&T, Addison-Wesley Publishing Company.
Keshav, "An Engineering Approach to Computer Networking: ATM Networks; the internet, and the Telephone Network," Addison-

(56) References Cited

OTHER PUBLICATIONS

Wesley Professional Computing Series, part 5 of 5, May 15, 1997, Copyright 1997, 142 pages, by AT&T, Addison-Wesley Publishing Company.
Khan, "IP Routing Use Cases," Cisco Press, Sep. 22, 2009, pp. 1-16, at URL: http://www.ciscopress.com/articles/printerfriendly.asp?p=1395746.
Lee, et al., "Open Shortest Path First (OSPF) Conformance and Performance Testing," White Papers, Ixia—Leader in Convergence IP Testing, Copyright 1998-2004, pp. 1-17.
Manolov, et al., "An Investigation into Multicasting, Proceedings of the 14th Annual Workshop on Architecture and System Design," (ProRISC2003), Veldhoven, The Netherlands, Nov. 2003, 6 pages.
May, et al., "An Experimental Implementation of Traffic Control for IP Networks," 1993, 11 pages, Sophia-Antipolis Cedex, France.
Moy, "OSPF Version 2," Network Working Group, RFC 2328, Apr. 1998, 204 pages.
Pangal, "Core Based Virtualization—Secure, Elastic and Deterministic Computing is Here . . . ," Blog Posting, May 26, 2009, 1 page, printed on Jul. 13, 2009, at URL:http://community.brocade.com/home/community/brocadeblogs/wingspan/blog/tags/serveri . . . .
Partridge, "A Proposed Flow Specification," RFC 1363, Sep. 1992, pp. 1-20, Network Working Group.
Pepelnjak, et al., "Using Multicast Domains," informIT, Jun. 27, 2003, pp. 1-29, at URL: http://www.informit.com/articles/printerfriendly.aspx?p=32100.
Product Category Brochure, "J Series, M Series and MX Series Routers—Juniper Networks Enterprise Routers—New Levels of Performance, Availability, Advanced Routing Features, and Operations Agility for Today's High-Performance Businesses," Juniper Networks, Nov. 2009, 11 pages.
Quickspecs, "HP Online VM Migration (for HP Integrity Virtual Machines)", Wordwide—Version 4, Sep. 27, 2010, 4 pages.
Riggsbee, "From ADC to Web Security, Serving the Online Community," Blog Posting, Jul. 8, 2009, 2 pages, printed on Dec. 22, 2009, at URL: http://community.brocade.com/home/community/brocadeblogs/wingspan/blog/2009/07/0 . . . .
Riggsbee, "You've Been Warned, the Revolution Will Not Be Televised," Blog Posting, Jul. 9, 2009, 2 pages, printed on Dec. 22, 2009, at URL: http://community.brocade.com/home/community/brocadeblogs/wingspan/blog/2009/07/0 . . . .
Rodbell, "Protocol Independent Multicast—Sparse Mode," CommsDesign, Dec. 19, 2009, pp. 1-5, at URL: http://www.commsdesign.com/main/9811/9811standards.htm.
Schlansker, et al., "High-Performance Ethernet-Based Communications for Future Multi-Core Processors," SC07 Nov. 10-16, 2007, Copyright 2007, 12 pages, ACM.
TCP/IP Illustrated, vol. 2: The Implementation, Gray R. Wright and W. Richard Stevens, Addison-Wesley 1995, 23 pages.
VMware, "Dynamic Balancing and Allocation of Resources for Virtual Machines", Product Datasheet, Copyright® 1998-2006, 2 pages.
VMware, "Live Migration for Virtual Machines Without Service Interruption", Product Datasheet, Copyright® 2009 VMware, Inc., 4 pages.
VMware, "Resource Management with VMware DRS", VMware Infrastructure, Copyright® 1998-2006, 24 pages.
VMware., "Automating High Availability (HA) Services With VMware HA", VMware Infrastructure, Copyright® 1998-2006, 15 pages.
Wolf, et al., "Design Issues for High-Performance Active Routers," IEEE Journal on Selected Areas in Communications, IEEE, Inc. New York, USA, Mar. 2001, vol. 19, No. 3, Copyright 2001, IEEE, 6 pages.

* cited by examiner

BIASING ACTIVE-STANDBY DETERMINATION

BACKGROUND

The present disclosure relates to computing systems that provide redundant computing domains. More particularly, in a computing system comprising multiple computing domains, techniques are provided for intentionally biasing the race to gain mastership between competing computing domains in favor of a particular computer domain.

In an effort to reduce downtime and increase availability, computing systems often provide redundant computing domains. In a typical configuration, during normal operations, one of the computing domains is configured to operate in an active mode and perform a set of functions of the computing system while the other computing domain is configured to operate in standby (or passive) mode in which the set of functions performed by the active computing domain are not performed. The standby computing domain remains ready to take over the functions performed by the active computing domain, and in the process become the active computing domain, in case of any event affecting the functionality of the current active computing domain. The process of a standby computing domain becoming the active computing domain is referred to as a failover. As a result of the failover, the computing domain operating in active mode prior to the failover may operate in standby mode as a result of the failover.

The active-standby model mentioned above is used in various fields to provide enhanced system availability. For example, in the networking field, redundancies are provided at various levels to achieve high availability and minimize data loss. For example, in some network environments, redundant network devices are provided with one network device operating in active mode (the active network device) and the other operating in standby (or passive) mode (the standby network device). The active network device performs the data forwarding-related functions while the standby network device operates in standby mode. Upon a failover, which may occur, for example, due to an error on the active device, the standby device becomes the active device and takes over data forwarding functionality from the previously active device. The previously active device may then operate in standby mode. The active-standby model using two network devices strives to reduce interruptions in data forwarding.

Redundancies may also be provided within a network device. For example, a network device may comprise multiple cards (e.g., multiple management cards, multiple line cards), each card having its own one or more physical processors. One card may be configured to operate in active mode while the other operates in standby mode. The active card performs the data forwarding and/or management related functions while the redundant second card operates in standby mode. Upon a failover, the standby card becomes the active card and starts performing the functions performed in active mode. The previous active card may then operate in standby mode.

The active-standby model may also be provided for in a system comprising a single multicore processor. For example, as described in U.S. Pat. No. 8,495,418, two partitions may be created in such a system with each partition being allocated one or more cores of the multiple cores of the processor. The partitions may be configured such that one partition operates in active mode while another operates in standby mode. In this manner, a single processor is able to provide active-standby functionality, thereby enhancing the availability of the system comprising the processor.

In a system comprising multiple computing domains configured to operate according to the active-standby model, when the system is power cycled, the multiple computing domains are booted and then compete with each other to become the active computing domain. This competition between the computing domains to become the active computing domain is commonly referred to as the race to gain mastership. Only one computing domain "wins" this race to gain mastership and becomes the active computing domain. The other "losing" computing domain becomes the standby computing domain. In conventional systems, which of the multiple computing domains becomes active is arbitrary.

BRIEF SUMMARY

The present disclosure relates to computing systems that provide multiple computing domains configured to operate according to an active-standby model. In such a computing system, techniques are provided for intentionally biasing the race to gain mastership between competing computing domains (i.e., to determine which computing domain operates in the active mode), in favor of a particular computing domain. The race to gain mastership may be biased in favor of a computing domain operating in a particular mode prior to the occurrence of the event that triggered the race to gain mastership. For example, in certain embodiments, the race to gain mastership may be biased in favor of the computing domain that was operating in the active mode prior to the occurrence of an event that triggered the race to gain mastership.

In certain embodiments, the biasing of the race to gain mastership in favor of a particular computing domain is time limited to a particular period of time. If the particular computing domain towards which the race is biased (e.g., the computing domain that operated in active mode prior to the occurrence of the event that triggered the race to gain mastership) is unable to become the active computing domain before the expiry of that particular time period, the biasing is removed and the race is then opened to all the competing computing domains. This time-limited biasing provides a mechanism to recover in the scenario where the computing domain towards which the race is biased has some problems and cannot become the active computing domain. In this scenario, the other computing domain is automatically, without any human intervention, provided the opportunity to become the active computing domain. In certain embodiments, systems, methods, code or instructions executed by one or more processing units are provided that enable the time-limited biasing described above.

For example, a computing system can comprise a first computing domain and a second computing domain. An event such as power being cycled to the system or a reset or reboot of the computing domains may cause a race to gain mastership to be triggered in the computing system between the two computing domains. Upon the occurrence of an event that triggers the race to gain mastership, each computing domain may execute arbitration logic to determine which computing domain becomes the active computing domain. The processing may be performed in parallel by the first and second computing domains.

In certain embodiments, as a result of executing the arbitration logic, a particular computing domain is configured to determine it operated in a mode (e.g., a first mode) towards which the race to gain mastership is to be biased.

Upon determining that the computing domain did not operate in the first mode prior to the occurrence of the event triggering the race to gain mastership, then the computing domain refrains, for a period of time, from attempting to start operating in the first mode. During this period of time, the other computing domain participating in the race to gain mastership is allowed to attempt to start operating in the first mode unhindered. In this manner, for the period of time, the computing domain against which the race to gain mastership is to be biased does not compete in the race to gain mastership while the computing domain in favor of which the race to gain mastership is to be biased competes uninhibited. After the period of time has passed, the particular computing domain that has refrained from participating in the race to gain mastership then determines whether the other computing domain is operating in the first mode. Upon determining that the other computing domain is operating in the first mode, i.e., has won the race to gain mastership, then the particular computing domain that has refrained from the race for the period of time starts operating in a second mode different from the first mode. Upon determining that the other computing domain is not operating in the first mode, i.e., has not already won the race to gain mastership, the particular computing domain that has refrained from the race for the period of time is now allowed to attempt to operate in the first mode.

In certain embodiments, the race to gain mastership may be biased in favor of a computing domain that operated in the active mode prior to the occurrence of the event that triggered the race to gain mastership. The computing domain operating in active mode may be configured to perform a set of functions that are not performed by the computing domain operating in standby mode (i.e., by the standby computing domain). In other embodiments, the race to gain mastership can be biased in favor of a computing domain that operated in the standby mode prior to the occurrence of the event that triggered the race to gain mastership. In this manner, the race to gain mastership can be biased in favor of a computing domain operating in a particular mode prior to occurrence of the event triggering the race to gain mastership. The biasing is time-limited for a period of time. Different techniques may be used for calculating this period of time.

In certain embodiments, whether or not a particular computing domain refrains from participating in the race to gain mastership for a period of time is determined based upon the mode in which the particular computing domain operated prior to the occurrence of the event that triggered the race to gain mastership. The particular computing domain may determine this based upon information stored in non-volatile memory prior to the occurrence of the event causing the race to gain mastership, where the stored information can be used to determine whether or not the particular computing domain operated in the mode in favor of which the race to gain mastership is to be biased. For example, the particular computing domain may read information from a non-volatile memory, the information stored in the non-volatile memory prior to the occurrence of the event triggering the race to gain mastership. Based upon this information, the particular computing domain may determine whether it is to refrain from participating in the race to gain mastership for a period of time.

After refraining from participating in the race to gain mastership for a period of time, a computing domain is configured to determine if the other computing domain has already won the race to gain mastership, i.e., is already operating in the first mode, and take appropriate actions based upon this determination. In certain embodiments, the computing domain may make this determination based upon information stored in a memory location, the memory location being readable and writable by both the computing domains. For example, a bit may be stored in memory indicative of whether the race to gain mastership has already been won. Based upon this bit information, the computing domain can determine whether the other computing domain is operating in the first mode.

In certain embodiments, each computing domain in a computing system is allocated its own set of resources, such as processing resources, memory resources, and the like. For example, in a computing system comprising a first computing domain and a second computing domain, a first set of one or more processing units can be allocated to the first computing domain and a second set of one or more processing units can allocated to the second computing domain. The processing resources allocated to a computing domain can include one or more processing units. A processing unit can be a processor or a core of a multicore processor. Accordingly, the one or more processing resources allocated to a computing domain can include a single processor, a single core, multiple processors, multiple cores, or various combinations of cores and processors.

In certain embodiments, the computing system may be embodied in a network device configured to forward data (e.g., data packets). The network device can comprise a set of one or more ports for forwarding one or more data packets from the network device, a plurality of processing units, a first computing domain that is allocated a first set of one or more processing units from the plurality of processing units, and a second computing domain that is allocated a second set of one or more processing units from the plurality of processing units. In response to the occurrence of an event that triggers a race to gain mastership, the first computing domain may be configured to refrain from attempting to start operating in a first mode for a period of time. In response to the occurrence of the event, the second computing domain may be configured to attempt to start operating in the first mode during the period of time. After the period of time has passed, the first computing domain may be configured to, if the second computing domain is operating in the first mode, start to operate in a second mode different from the first mode, and, if the second computing domain is not operating in the first mode, attempt to operate in the first mode.

In one embodiment, the network device may be configured such that a set of functions is performed by the first computing domain or the second computing domain when operating in the first mode and not performed when operating in the second mode. In another embodiment, the network device may be configured such that a set of functions is performed when operating in the second mode and is not performed when operating in the first mode. The first computing domain may be configured to, based upon information stored prior to the occurrence of the event, determine whether the first computing domain operated in the first mode prior to the occurrence of the event.

In certain embodiments, the first computing domain in the network device corresponds to a first card of the network device and the second computing domain corresponds to a second card of the network device. In some other embodiments, the first computing domain and the second computing domain may be located on a card of the network device.

In certain embodiments, the first computing domain in the network device may be allocated a first set of one or more processing units and the second computing domain may be allocated a second set of one or more processing units. A processing unit can be a processor or a core of a multicore processor. Accordingly, the processing resources allocated to a computing domain in the network device can include a single processor, a single core, multiple processors, multiple cores, or various combinations of cores and processors.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

The present disclosure relates to computing systems that provide multiple computing domains configured to operate according to an active-standby model. In such a computing system, techniques are provided for intentionally biasing the race to gain mastership between competing computing domains, i.e., to determine which of the computing domains operates in the active mode, in favor of a particular computer domain. The race to gain mastership may be biased in favor of a computing domain operating in a particular mode prior to the occurrence of the event that triggered the race to gain mastership. For example, in certain embodiments, the race to gain mastership may be biased in favor of the computing domain that was operating in the active mode prior to the occurrence of an event that triggered the race to gain mastership.

Figure 1:
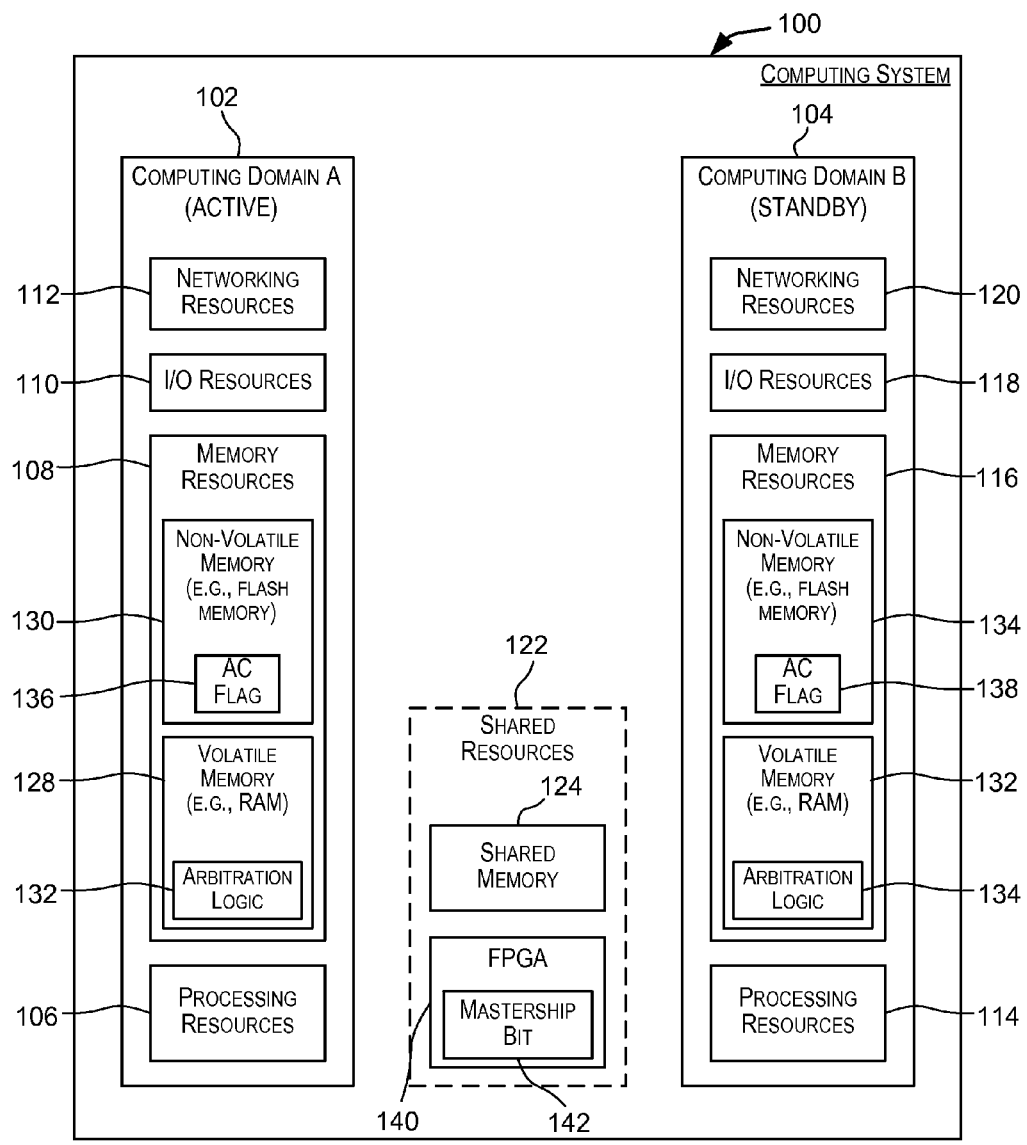
FIG. 1 depicts a simplified high level diagram of a computing system according to certain embodiments of the present invention.

FIG. 1 depicts a simplified high level diagram of a computing system 100 according to certain embodiments of the present invention. The embodiment depicted in FIG. 1 is merely an example and is not intended to unduly limit the claimed embodiments of the present invention. One of ordinary skill in the art would recognize many variations, alternatives, and modifications. Examples of computing system 100 include various computers, mobile computing devices, networking devices such as routers and switches (e.g., various network devices provided by Brocade Communications Systems, Inc.), and other devices.

Computing system 100 may be configured to provide multiple computing domains such as a computing domain "A" (CD_A) 102 and a computing domain "B" (CD_B) 104 depicted in FIG. 1. Although FIG. 1 shows that computing system 100 comprises two computing domains, this is not intended to be limiting. In some embodiments, a computing system can be configured to provide and support more than two computing domains.

In certain embodiments, a computing domain can logically be considered as a collection of resources. Each computing domain may be allocated its own share of system resources of computing system 100, including but not limited to processing resources, memory resources, input/output (I/O) resources, networking resources, and other types of resources. For example, as shown in FIG. 1, CD_A 102 is allocated processing resources 106, memory resources 108, I/O resources 110, and networking resources 112. Likewise, the resources allocated to CD_B 104 can include processing resources 114, memory resources 116, I/O resources 118, and networking resources 120. The amount of a resource of a particular resource type allocated to one computing domain may be the same as or different from the amount of the resource of the same type allocated to another computing domain. For example, the number of processing resources 106 allocated to CD_A 102 may be the same as or different from the number of processing resources 114 allocated to CD_B 104.

The resources allocated to a computing domain can be accessed and used only by that computing domain and are not accessible to the other computing domains. In this manner, each computing domain has its own secure and private set of resources. A computing domain may use its allocated resources and operate independently of the other computing domains in computing system 100. For example, a first computing domain may execute a first set of programs independently of a second computing domain that may be executing a different set of programs possibly in parallel with the first computing domain. In some embodiments, one computing domain may not even be aware of the other computing domains within computing system 100.

In some embodiments, certain resources of computing system 100 may be configured as shared resources 122 that can be accessed and used by multiple computing domains. For example, in the embodiment depicted in FIG. 1, shared resources 122 include shared memory resources 124 and a field programmable gate array (FPGA) 126. Shared resources 122 may be used for multiple purposes. In some embodiments, shared resources 122 may be used for facilitating communications or messaging between the computing domains.

In some embodiments, an administrator or user of computing system 100 may configure the number of computing domains provided by computing system 100, the resources allocated to each computing domain, and the shared resources. For example, the administrator may specify configuration information identifying the number of computing domains to be set up, the resources to be allocated to each computing domain, information related to shared resources, and other configuration information. In some embodiments, when computing system 100 is powered up, after booting up (or as part of its boot up sequence), system 100 can be configured to read the configuration information, and per the configuration information, create one or more computing domains, allocate resources to the computing domains, and configure shared resources.

The processing resources allocated to a computing domain can include one or more processing units. A processing unit can be a processor or a core of a multicore processor. Accordingly, the processing resources allocated to a computing domain can include a single processor, a single core, multiple processors, multiple cores, or various combinations of cores and processors.

The memory resources allocated to a computing domain can include volatile and non-volatile memory resources. Volatile memory resources, also sometimes referred to as system memory resources, may include random access memory (RAM), and the like. Non-volatile memory resources may include flash memory, disk memory, and the like. For example, in the embodiment depicted in FIG. 1, memory resources 108 allocated to CD_A 102 include volatile memory resources 128 and non-volatile memory resources 130, and memory resources 116 allocated to CD_B 104 include volatile memory resources 132 and non-volatile memory resources 134.

The volatile memory of a computing domain may store various data used by the computing domain during runtime operations. For example, the volatile memory assigned to a computing domain may store, during runtime, an operating system for the computing domain and data related to one or more entities executed by the partition. The data may include code or programs or instructions that are executed by the processing resources of the computing domain and other data. The entities executed by a computing domain may include, without restriction, an application, a process, a thread, an operating system, a device driver, and the like. For example, in the embodiment depicted in FIG. 1, volatile memory 128 allocated to CD_A 102 may store an operating system for CD_A 102, and programs and other data related to entities executed by processing resources 106 of CD_A 102. In a similar manner, volatile memory 132 allocated to CD_B 104 may store an operating system for CD_B 104, and programs and other data related to entities executed by processing resources 114 of CD_B 104. The operating system for CD_A 102 may be the same as or different from the operating system for CD_B 104.

The non-volatile memory of a computing domain may store data that is to be persisted, for example, data that is to be persisted even when computing system 100 or the particular computing domain is power cycled. For example, data used or written by CD_A 102 that is to be persisted across a power cycle or a boot up of CD_A 102 may be stored in non-volatile memory 130 of CD_A 102.

The I/O and networking resources allocated to computing domains can include various hardware resources, access to various communication buses (e.g., access to PCIe), Ethernet interfaces, resources such as security engines, queue managers, buffer managers, pattern matching engines, direct memory access (DMA) engines, and the like. The I/O and networking resources of computing system 100 may be allocated exclusively to each computing domain or alternatively may be shared between multiple computing domains. For example, in one embodiment, a private Ethernet interface may be assigned to each computing domain, while access to PCIe may be shared between the computing domains.

In a computing system, such as computing system 100, that can be configured to provide multiple computing domains, in an effort to reduce downtime and increase availability of the computing system, during normal operations, one of the computing domains can be configured to operate in an active mode while the other computing domain operates in standby (or passive) mode. For example, in the embodiment depicted in FIG. 1, CD_A 102 is operating in active mode and CD_B 104 is operating in standby mode. The computing domain operating in active mode (i.e., the active computing domain) is configured to perform a set of functions that are not performed by the computing domain operating in standby mode (i.e., by the standby computing domain).

The set of functions that are performed in active mode and not performed in standby mode depend upon the context of use of computing system 100. For example, if computing system 100 were a network device such as a router or switch, the active computing domain may be configured to perform functions related to data forwarding such as managing network topology information, maintaining routing tables information, managing and programming I/O devices such as I/O ports of the network device, programming forwarding hardware, executing various network protocols and maintaining protocol/state information, maintaining timing information/logs, and the like. These functions are not performed by the standby computing domain.

According to the active-standby model, the standby computing domain remains ready to take over and perform the functions performed by the active computing domain when an event occurs that results in the current active computing domain not being able to perform the set of functions. When such an event occurs, the standby computing domain is configured to start operating in the active mode (i.e., become the active computing domain) and start performing the set of functions that are performed in the active mode. The process of a standby computing domain becoming the active computing domain and taking over performance of the set of functions from the previous active computing domain is referred to as a failover. As a result of the failover, the previous active computing domain, i.e., the computing domain operating in the active mode prior to the failover, may be reset and operate in the standby mode as a result of the failover.

For example, if computing system 100 is a network device, the new active computing domain may start performing the data forwarding functions that were previously performed by the previous active computing domain, preferably without any impact on the functionality of the network device or without any loss of data. A failover thus increases the availability of the network device while ensuring continued forwarding operations without any data loss.

An event that causes a failover (a failover event) can, at a high level, be categorized into one of the following two categories:

(1) a voluntary failover event, and
(2) an involuntary failover event.

Events that cause a voluntary or involuntary failover may come in different forms.

A voluntary failover event is one that causes the active computing domain to voluntarily initiate a failover and yield control to the standby computing domain. An example of such an event is receiving a command line instruction from a network administrator or user of the computing system to perform a voluntary failover. Upon receiving this command, the active computing domain initiates failover processing as a result of which the standby computing domain becomes the active computing domain and the previous active computing domain may become the standby computing domain.

There are various situations when this may be performed. As one example, a voluntary failover may be performed when software on the active computing domain is to be upgraded. In this situation, an administrator may voluntarily issue a command or instruction to cause a failover to occur. For further details related to performing a failover in a network device to perform a software upgrade, please refer to U.S. Pat. Nos. 7,188,237, 7,284,236, and 8,495,418.

As another example, a voluntary failover may be initiated by a system administrator upon noticing performance degradation on the active computing domain or upon noticing that software executed by the active computing domain is malfunctioning. In such situations, the network administrator may voluntarily issue a command for a failover with the hope that problems associated with the active computing domain will be remedied when the standby computing domain becomes the new active computing domain. Various interfaces, including a command line interface (CLI), may be provided for initiating a voluntary failover.

An involuntary failover event typically occurs due to some critical failure in the active computing domain. Examples include when a hardware watchdog timer goes off (or times out) and resets the active computing domain possibly due to a problem in the kernel of the operating system loaded for the active computing domain, critical failure of software executed by the active computing domain, loss of heartbeat, and the like. An involuntary failover event causes the standby computing domain to automatically become the active computing domain.

During normal operations, the active computing domain performs a set of functions that are not performed by the standby computing domain. In order to perform the set of functions, the active computing domain generally maintains various types of state information that is used by the active computing domain for performing these functions. For example, in a network device, the active computing domain may maintain state information comprising network topology information, routing tables, queue structures, data buffers, hardware specific state information such as configuration tables, port maps, etc., and other types of information. When the standby computing domain becomes the active computing domain after a failover, it also needs this state information in order to perform the functions that are performed in active mode and to do so in a non-disruptive manner. In some embodiments, the standby computing domain builds this state information after it becomes the active computing domain. In some other embodiments, the active computing domain may periodically send synchronization updates to the standby computing domain to synchronize the standby's state information with the active's state information. The active computing domain may communicate state information to the standby computing domain using, for example, a messaging mechanism. In one embodiment, the active computing domain is configured to periodically check if the state information on the standby computing domain is synchronized with the state information on the active computing domain. If not synchronized, then the active computing domain communicates state information to the standby computing domain to bring its state information in synchrony with the state information maintained by the active computing domain.

Before a computing system comprising multiple computing domains can operate according to the active-standby model, an initial determination is made by the computing system as to which of the multiple computing domains will become the active computing domain and which will become the standby computing domain. For example, in computing system 100, a determination has to be made whether CD_A 102 or CD_B 104 will become the active computing domain. This processing is performed, for example, when computing system 100 is power cycled (e.g., when it is powered on, or it restarts due to power being cycled to the system).

In some embodiments, the determination of which computing domain will become the active computing domain is achieved by executing arbitration logic that results in one computing domain becoming the active computing domain and the other computing domain becoming the standby computing domain. As part of this arbitration logic, the multiple computing domains compete with each other to become the active computing domain. This competition between the computing domains to become the active computing domain (or the "master") is commonly referred to as the race to gain mastership. Only one computing domain "wins" this race to gain mastership and becomes the active computing domain and the other "losing" computing domain becomes the standby computing domain.

In conventional systems, which of the competing computing domains becomes the active computing domain and wins the race to gain mastership is arbitrary. This arbitrariness however becomes a problem in certain situations. For example, as previously described, the active computing domain in a network device generally stores state information that is used by the active computing domain to perform the set of functions that are performed in the active mode. The standby computing domain may not have this state information when it becomes the active computing domain or, even if it has received synchronization updates from the active computing domain, may not have the most up-to-date information. Accordingly, in many situations, when a standby computing domain becomes the active computing domain, it has to first spend time and resources (e.g., processing and memory resources) to build this information. Accordingly, after the occurrence of an event (mastership race triggering event that triggers a race to gain mastership, if the computing domain that was a standby computing domain prior to the event wins the race and becomes the active computing domain, it has to first spend time and resources to build this information. This, however, would not be the case if the race to gain mastership is won by the computing domain that was operating in active mode prior to the mastership race triggering event. It is thus desirable in this scenario that the race to gain mastership be won by the computing domain that was operating in active mode prior to the occurrence of the mastership race triggering event.

While, in the above networking example, it is desirable that the previously active computing domain wins the race to gain mastership and becomes the active computing domain after the occurrence of the mastership race triggering event, in some other situations it may be desirable that the computing domain operating as a standby prior to the occurrence of the mastership race triggering event wins the race to gain mastership and becomes the active computing domain. For example, consider the situation where the mastership race triggering event was caused by a fatal failure in the active computing domain. In this situation, it may be preferred that the standby computing domain wins the race to gain mastership and becomes the active computing domain. Accordingly, depending upon the context, it may be desirable that a computing domain operating in a particular mode, either active or standby, prior to the occurrence of the mastership race triggering event wins the race to gain mastership and becomes the active computing domain.

Certain embodiments of the present invention enable such intentional biasing towards a particular computing domain based upon the mode of operation of the computing domain prior to occurrence of the mastership race triggering event. Between multiple computing domains participating in the race to gain mastership, techniques are provided that automatically and intentionally bias the race to gain mastership in favor of a particular computer domain based upon the mode of operation of that particular computing domain prior to the occurrence of the mastership race triggering event. For example, in certain embodiments, the race to mastership may be biased in favor of the computing domain that was operating in the active mode prior to an event that triggered the race to mastership.

Additionally, the biasing is time limited. If the particular computing domain (e.g., the active computing domain prior to the occurrence of the mastership race triggering event) towards which the race is biased is unable to become the active computing domain within a particular time period, the biasing is removed after passage of that time period and the race is then opened to all the competing computing domains. This time limiting biasing provides a recovery mechanism to cover scenarios where the computing domain towards which the race is biased has some problems and cannot become the active computing domain.

Figure 2:
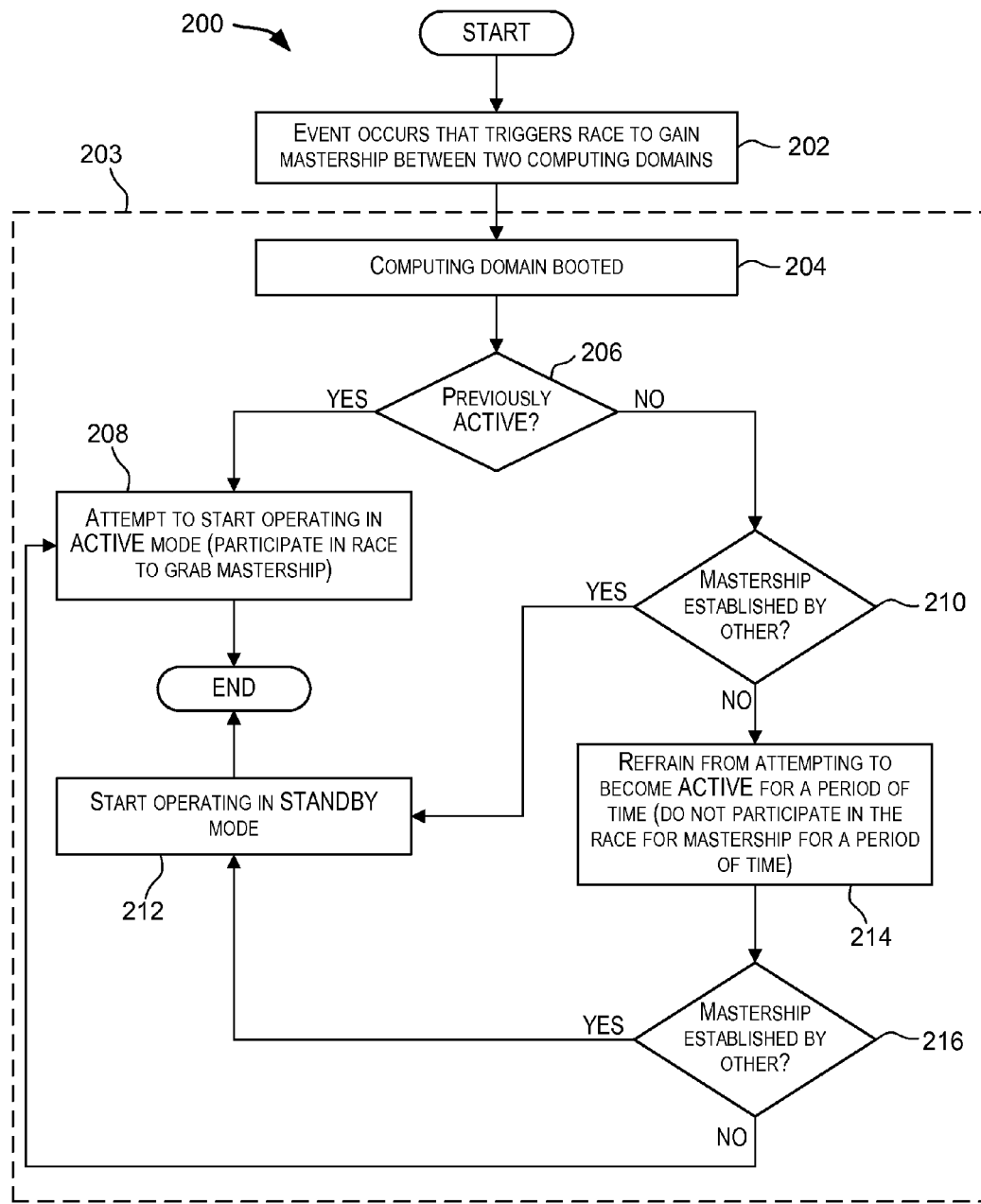
FIG. 2 depicts a simplified flowchart depicting a high-level method for biasing the race to gain mastership in favor of a particular computing domain according to an embodiment of the present invention.

FIG. 2 depicts a simplified flowchart 200 depicting a high-level method for biasing the race to gain mastership in favor of a particular computing domain according to an embodiment of the present invention. The method may be embodied in software (e.g., code, program, instructions) executed by a processor, in hardware, or combinations thereof. The software may be stored on a non-transitory computer-readable storage medium such as a hard disk drive, a floppy disk drive along with associated removable media, a Compact Disk Read Only Memory (CD-ROM) drive, an optical drive, removable media cartridges, a memory or memory device, and other like storage media. The method depicted in FIG. 2 is not intended to be restrictive.

In the embodiment depicted in FIG. 2, the biasing is performed in favor of a computing domain that was operating in active mode prior to the event that caused the processing in FIG. 2 to be triggered. This is, however, not intended to be limiting. In alternative embodiments, the biasing can also be performed in favor of the computing domain that was operating in standby mode prior to the event that caused the processing in FIG. 2. Accordingly, in general, the teachings of the method depicted in FIG. 2 can be used to bias the race to gain mastership and become the active computing domain in favor of a computing domain operating in a particular mode prior to the event that triggers the race to gain mastership. Additionally, the biasing is time limited such that if the particular computing domain towards which the race is biased is unable to become the active computing domain within a particular time period, the biasing is removed after passage of that time period, and the race is then opened to all the competing computing domains.

In some embodiments, whether the processing is to be biased in favor of the computing domain that was operating in active mode prior to the occurrence of the event that triggered the race to gain mastership or whether the processing is to be biased in favor of the computing domain that was operating in standby mode prior to the occurrence of the event that caused the race to gain mastership may be preconfigured or specified by a user of computing system 100. For example, in one embodiment, the biasing information may be stored in a configuration file. In certain embodiments, a default may be preconfigured. For example, in the default, the processing may be biased in favor of the computing domain that was operating in active mode prior to the event that caused the race to gain mastership processing to be triggered. In some other embodiments, a user of computing system 100 may provide information indicative of the computing domain towards which the processing is to be biased user via a command line instruction.

As depicted in FIG. 2, processing is initiated at 202 when an event occurs that triggers the race to gain mastership. In some embodiments, the race to gain mastership is triggered when power is cycled to the computing domains, for example, when power is cycled to the computing system comprising the computing domain. A race to gain mastership may also be triggered when the computing domains are reset or rebooted. The event that triggers a race to gain mastership may be a voluntary or an involuntary event. Examples of events include, without restriction, a catastrophic system failure of computing system 100, loss of power to the computing domains, rebooting of both the computing domains, etc. The race to gain mastership may also be triggered due to a voluntary event such as in response to a command or instruction received from a user of computing system 100 to power cycle computing system 100, reboot both computing domains, and so on. The command may, for example, be received via a command line interface (CLI) provided by computing system 100.

Upon the occurrence of the event in 202, processing depicted in box 203 is then performed by each computing domain that competes in the race to gain mastership. The processing may be performed in parallel by the computing domains. For example, for computing system 100 depicted in FIG. 1, the processing in box 203 may be performed by CD_A 102 and by CD_B 104. In some embodiments, the processing may be performed as a result of code executed by each computing domain. For a computing domain, the code execution may be part of the boot-up sequence of the computing domain or may be performed after the computing domain has booted-up. For example, in FIG. 1, CD_A 102 may perform the processing depicted in box 203 as a result of execution of arbitration logic code 132, which may be executed by the processing resources 106 of CD_A 102. Likewise, CD_B 104 may perform the processing depicted in box 203 as a result of execution of arbitration logic 134, which may be executed by processing resources 114 of CD_B 104.

At 204, the computing domain performing the processing is booted. At 206, a check is then made as to whether the computing domain performing the processing was operating in the active mode prior to the occurrence of the event that triggered the race to gain mastership. In some embodiments, this is determined based upon information stored in non-volatile memory for the computing domain prior to the occurrence of the event that triggers the race to gain mastership.

In certain embodiments, during normal processing of computing system 100, a computing domain is configured to store information to its non-volatile memory indicative of the mode of operation (i.e., active mode or passive mode) of the computing domain. The computing domains may be configured to update this information when a failover occurs. For example, in FIG. 1, CD_A 102 may store information 136 in its non-volatile memory 130 indicative of its operating mode. Likewise, CD_B 104 may store information 138 in its non-volatile memory 134 indicative of its operating mode. The mode information is thus stored prior to the occurrence of the event triggering the race to gain mastership. In such an embodiment, upon the occurrence of an event that triggers the processing depicted in FIG. 2, as part of the processing in 206, a computing domain can read this previously-stored piece of information from the non-volatile memory and, based upon the read information, determine whether the computing domain was operating in the active mode or passive mode prior to the occurrence of the event that triggered the race to gain mastership.

In some embodiments, as described above, both the computing domains may be configured to store operating mode information to their respective non-volatile memories. In some other embodiments, only the computing domain operating in a particular mode may be configured to store the mode indicating information in its non-volatile memory. For example, in certain embodiments, only the computing domain operating in active mode may be configured to store information in its non-volatile memory indicating that the computing domain was operating in active mode. For example, if CD_A 102 was operating in active mode prior to occurrence of the event in 202, then CD_A 102 may store "active flag" information 136 to non-volatile memory 130. In such an embodiment, no such information may be stored by CD_B 104 to its non-volatile memory 134 since it is operating in standby mode. In such embodiments, as part of the processing in 206, each computing domain may access its non-volatile memory to see if it stores any mode indicating information. The computing domain that is able to access and read this information from its non-volatile memory determines that it was operating in active mode prior to the occurrence of the event in 202. Alternatively, absence of this information from a computing domain's non-volatile memory indicates that the computing domain was operating in standby mode prior to the occurrence of the event in 202.

If it is determined in 206 that the computing domain was operating in active mode prior to the event occurrence in 202 (or more generally, was operating in the mode in favor of which the race to gain mastership is to be biased), then at 208, the computing domain participates in the race to gain mastership and attempts to start operating in the active mode.

If it is determined in 206 that the computing domain was operating in standby mode prior to the event occurrence in 202 (or more generally, was operating in a mode other than the mode in favor of which the race to gain mastership is to be biased), then at 210, a check is made to see if the other computing domain has already established mastership (i.e., has won the race to gain mastership) and started to operate in the active mode. If it is determined in 210 that the other computing domain has established mastership and is already operating in the active mode (i.e., has won the race to gain mastership), then at 212, the computing domain performing the processing starts operating in the standby mode.

There are various ways in which a particular computing domain can determine if the other computing domain is already operating in active mode in 210 (and also later in 216). In some embodiments, as soon as a computing domain starts to operate in the active mode, it is configured to write information to memory location indicating that mastership has already been established. The memory location where this information is written may be part of the memory resources that are shared between the multiple computing domains such that each computing domain is able to write to and read from this memory location. Appropriate mechanisms may be provided such that only one computing domain is able to start operating in active mode and once that has occurred, no other computing domain can operate in active mode. Appropriate memory locking mechanisms are provided such that only the computing domain that has gained mastership can write information to the memory location that a computing domain has started to operate in active mode.

In one embodiment, as shown in FIG. 1, the memory location to which the information is written may be a register of a field programmable gate array (FPGA) 140 that is part of shared resources 122. The FPGA register may store a "mastership" bit 142, which when "set" indicates that the race to gain mastership has already been won and that a computing domain has already started to operate in the active mode. In such an embodiment, the computing domain that wins the race to gain mastership may be configured to "set" bit 142. As part of the processing in 210, a computing domain can check whether mastership bit 142 has been "set" or not in the FPGA register. If "set," it indicates that some other computing domain has won the race to gain mastership and become the active computing domain, and processing then continues with 212 at which the computing domain starts to operate in the standby mode.

If it is determined instead in 210 that no other computing domain has yet started to operate in active mode, then at 214, the computing domain performing the processing refrains from attempting to become the active computing domain for a period of time. Essentially, for that period of time, the computing domain intentionally does not participate in the race to gain mastership. This automatically biases the race to gain mastership in favor of the other computing domain, which is not constrained in any way during this time period from attempting to start operating in the active mode. In this manner, for the period of time, the race to gain mastership is biased in favor of the non-constrained computing domain and biased against the computing domain that refrains from participating in the race to gain mastership.

In certain embodiments, the period of time for which the computing domain refrains from participating in the race to gain mastership is configured by a user or administrator of computing system 100. In some other embodiments, the computing domain performing the processing may be configured to calculate the period of time.

After the time period has passed in 214, the computing domain performing the processing in 203 then checks at 216 if the other computing domain has already established mastership (i.e., has won the race to gain mastership) and started to operate in the active mode. If it is determined in 216 that another computing domain is already operating in active mode, then at 212, the computing domain starts operating in the standby mode. If, however, it is determined in 216 that the other computing domain has not yet become the active computing domain, then at 208, the computing domain performing the processing also joins the race to gain mastership.

As described above, in 214, the computing domain refrains from participating in the race to gain mastership for a period of time, but participates in the race to gain mastership after that period of time has passed. In this manner, the biasing of the race to gain mastership in favor of a particular computing domain is time limited to a period of time. If the particular computing domain towards which the race is biased (e.g., the active computing domain prior to the occurrence of the mastership race triggering event) is unable to become the active computing domain before the expiry of that particular time period, the biasing is removed and the race is then opened to all the competing computing domains. This time-limited biasing provides a mechanism to recover in the scenario where the computing domain towards which the race is biased has some problems and cannot become the active computing domain. In this scenario, the other computing domain is automatically, without any human intervention, provided the opportunity to become the active computing domain.

As an example of application of flowchart 200 in FIG. 2, consider a scenario where, prior to the event that causes the race to gain mastership, CD_A 102 of computing system 100 was operating in the active mode and CD_B 104 was operating in the standby mode. After the occurrence of an event that triggers the race to gain mastership, both CD_A 102 and CD_B 104 perform the processing depicted in box 203. The processing may be performed possibly in parallel by the two computing domains. At 206, CD_A 102 determines that it was the active computing domain prior to the event that triggered the race to gain mastership processing and accordingly right away attempts to start operating in the active mode per 208. CD_B 104, on the other hand, determines at 206 that it was not operating in the active mode prior to the event triggering the race to gain mastership processing, and accordingly determines in 210 if the other computing domain, i.e., CD_A 102, has already started to operate in the active mode. If so, at 212, CD_B 104 starts to operate in the standby mode. If CD_B 104 determines in 210 that CD_A 102 has not already become the active computing domain, then at 214, CD_B 104 intentionally refrains from participating in the race to gain mastership (i.e., refrains from attempting to become the active computing domain) for a period of time. After the period of time has passed, at 216, CD_B 106 again determines if another computing domain has won the race to gain mastership and become the active computing domain. If yes, then at 212, CD_B 106 starts operating in the standby mode. If not, then at 208, CD_B 106 joins the race to gain mastership and tries to become the active computing domain. In this manner, for a period of time, the race to gain mastership is biased in favor of CD_A 102, the computing domain operating in active mode prior to the event that triggers the race to gain mastership, and biased against CD_B 104, the computing domain operating in standby mode prior to the event that triggers the race to gain mastership. However, if CD_A 102 is unable to become the active computing domain during the biasing period, then after the period has passed, both the computing domains compete in the race to gain mastership on equal grounds.

Figure 3:
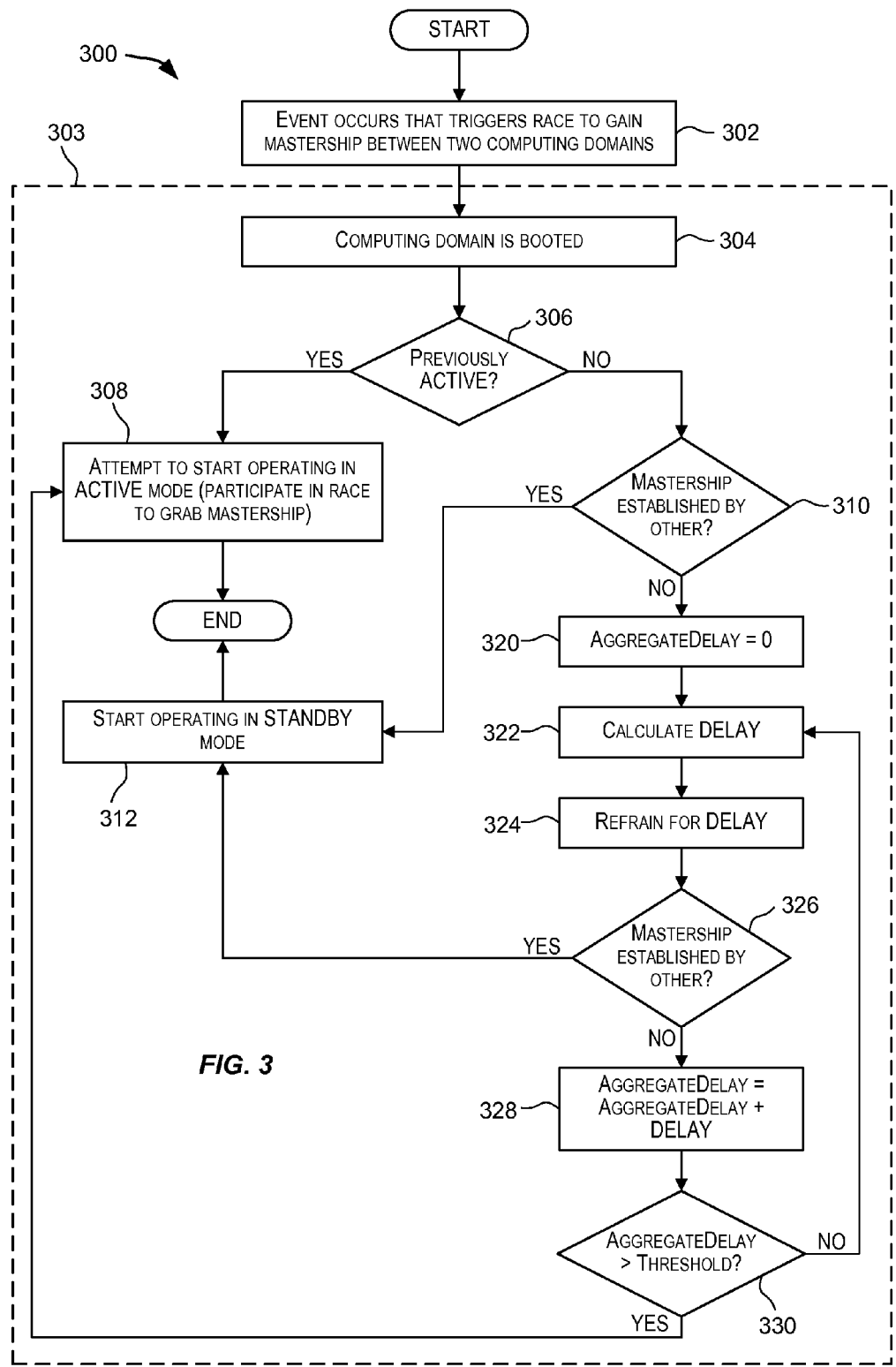
FIG. 3 depicts a simplified flowchart depicting another high-level method for biasing the race to gain mastership in favor of a particular computing domain according to an embodiment of the present invention.

FIG. 3 depicts a simplified flowchart 300 depicting another high-level method for biasing the race to gain mastership in favor of a particular computing domain according to an embodiment of the present invention. The method may be embodied in software (e.g., code, program, instructions) executed by a processor, in hardware, or combinations thereof. The software may be stored on a non-transitory computer-readable storage medium such as a hard disk drive, a floppy disk drive along with associated removable media, a Compact Disk Read Only Memory (CD-ROM) drive, an optical drive, removable media cartridges, a memory or memory device, and other like storage media. The method depicted in FIG. 3 is not intended to be restrictive. In the embodiment depicted in FIG. 3 the biasing is, like in FIG. 2, performed in favor of a computing domain that was operating in active mode prior to the event that caused the processing in FIG. 3 to be triggered. This is however not intended to be limiting.

Comparing FIG. 3 to FIG. 2, the processing performed at 302, 304, 306, 308, 310, and 312 is similar to processing performed at 202, 204, 206, 208, 210, and 212, respectively, and has been described above for FIG. 2. In some embodiments, the processing performed at 320, 322, 324, 326, 328, and 330 in FIG. 3 may be performed at 214 and 216 in FIG. 2.

After determining in 306 that the computing domain (i.e., the computing domain doing the processing) was not the active computing domain prior to the event triggering the race to gain mastership and further upon determining in 310 that the other computing domain has not become the active computing domain as yet, at 320, a variable "AggregateDelay" is initialized to zero. This variable is used to accumulate the total delay of time during which the computing domain refrains from participating in the race to gain mastership.

At 322, a "DELAY" period of time is calculated. In some embodiments, this may be preset or preconfigured by a user of the computing system. In some other embodiments, the DELAY may be calculated based upon one or more factors.

At 324, the computing domain performing the processing refrains from attempting to become the active computing domain for the period of time corresponding to "DELAY". Essentially, for this period of time, the computing domain intentionally does not participate in the race to gain mastership, thereby biasing the race to gain mastership in favor of the other computing domain, which is not constrained in any way during this time period from attempting to start operating in the active mode.

After the "DELAY" time period has passed in 324, the computing domain performing the processing then checks at 326 if the other computing domain has already established mastership (i.e., has won the race to gain mastership) and started to operate in the active mode. If yes, then at 314, the computing domain starts operating in the standby mode. If, however, it is determined in 326 that the other computing domain has not yet become the active computing domain, then at 328, the "AggregateDelay" variable is updated to "AggregateDelay=AggregateDelay+DELAY". Thus, with each iteration, the AggregateDelay variable keeps track of the amount of time that the computing domain has been refrained from participating in the race to gain mastership.

At 330, a check is made to see if the AggregateDelay has exceeded a preconfigured threshold. The threshold may be configured by an administrator or user of computing system 100. If it is determined in 330 that the value of AggregateDelay has not exceeded the threshold, then processing continues with 322 wherein another DELAY time period is calculated and then processing continues as described above. If, however, it is determined in 330 that the value of AggregateDelay has exceeded the threshold, then it indicates that the period of time for which the race to gain mastership is to be biased has passed and at 308 the computing domain performing the processing also joins the race to gain mastership.

Various different techniques may be used to calculate the DELAY in each processing iteration in FIG. 3. In some embodiments, the DELAY that is calculated in 322 may be the same for each iteration. For example, in one embodiment, the threshold is set to one minute and the delay for each iteration is set to one second. In other embodiments, the DELAY that is calculated in 322 may change from one processing iteration to the next. For example, in one embodiment, the value of DELAY may be increased with each successive iteration (e.g., 1 second for the first iteration, 2 seconds for the second iteration, 3 seconds for the third iteration, and the like).

Figure 4:
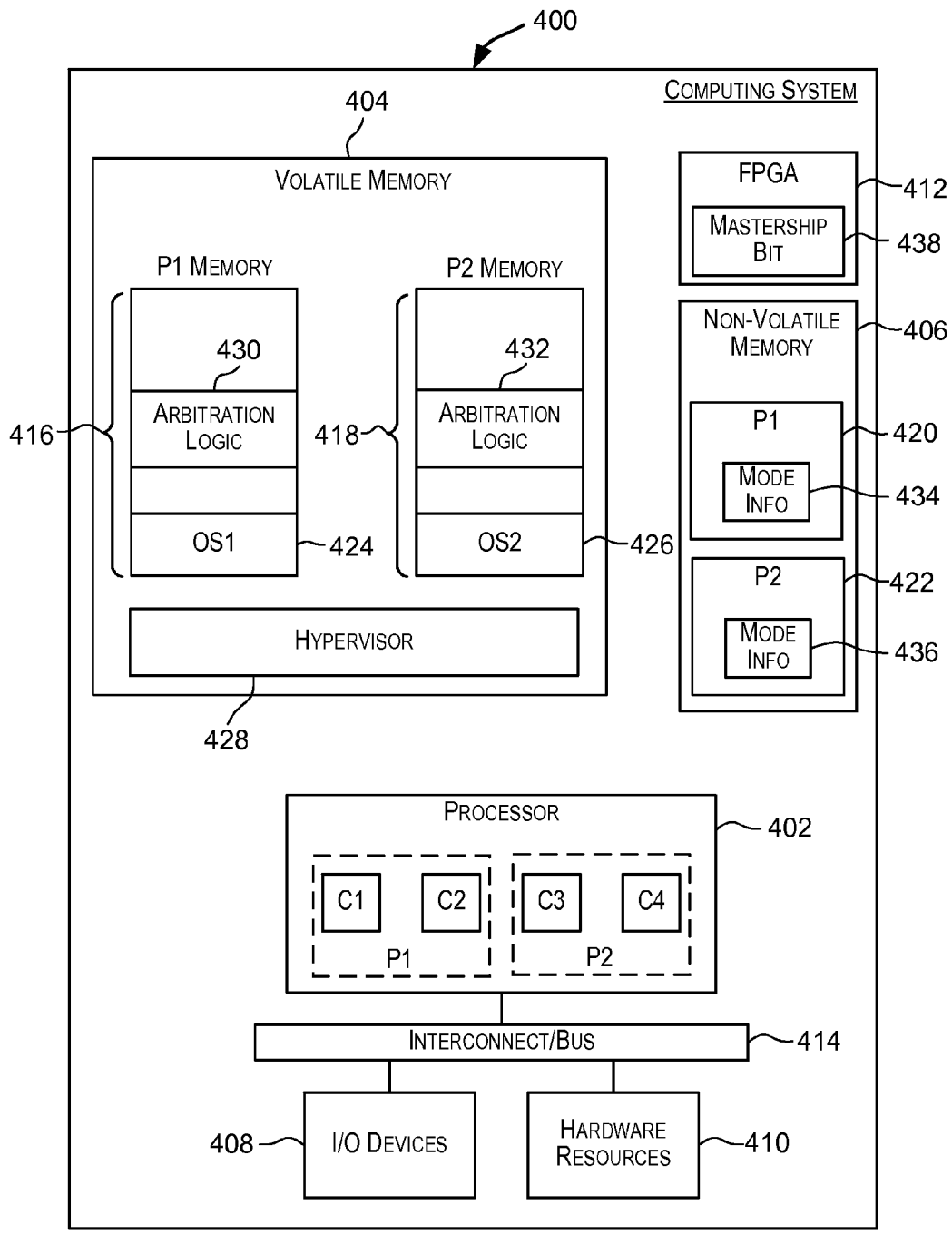
FIG. 4 is a simplified block diagram of a system 400 that may incorporate an embodiment of the present invention.

Computing system 100 can be embodied in various different forms. The computing domains with a computing system can also be embodied in various different forms within a computing system. FIG. 4 is a simplified block diagram of a system 400 that may incorporate an embodiment of the present invention. System 100 may, for example, be a network device such as a router or switch. In the embodiment depicted in FIG. 4, system 400 comprises a single physical multicore processor 402, volatile or system memory 404, non-volatile memory 406, I/O devices 408, hardware resources 410, and an FPGA 412. Processor 402 may be coupled to I/O devices 408, hardware resources 410, system memory 404, and non-volatile memory 406 via one or more interconnects or buses 414. System 400 depicted in FIG. 1 is merely an example and is not intended to unduly limit the scope of embodiments of the present invention as recited in the claims. One of ordinary skill in the art would recognize many variations, alternatives, and modifications.

Physical processor 402 represents the processing resources of system 400. In one embodiment, processor 402 is a multicore processor comprising a plurality of processing cores. For example, in the embodiment depicted in FIG. 4, processor 402 comprises four cores: C1, C2, C3, and C4. Examples of a multicore processor include but are not limited to various multicore processors provided by Intel, AMD, ARM, Freescale Semiconductor, Inc. (e.g., the QorIQ and the PowerQUICC lines of processors provided by Freescale), and others.

Memory resources of system 400 include volatile memory 404 and non-volatile memory 406. Volatile memory 404 represents the system memory resources of system 400 that are available to physical processor 402. Information related to runtime processing performed by processor 402 may be stored in memory 404. Memory 404 may be a RAM (e.g., SDR RAM, DDR RAM) and is sometimes referred to as the system's main memory. Non-volatile memory 406 may be used for storing information that is to be persisted beyond a power cycle of system 400. I/O devices 408 may include devices such as Ethernet devices, PCIe devices, eLBC devices, and others. Hardware resources 410 can include resources such as security engines, queue managers, buffer managers, pattern matching engines, direct memory access (DMA) engines, and so on.

In certain embodiments, system 400 can be configured to provide multiple computing domains. In the embodiment depicted in FIG. 4, the computing domains are in the form of and referred to as logical partitions. For example, system 400 may be configured to support two logical partitions P1 and P2, each logical partition (or computing domain) having its own dedicated processing and memory resources. For example, in the embodiment depicted in FIG. 4, the processing resources may be partitioned such that cores C1 and C2 are allocated or assigned to partition P1 and cores C3 and C4 are allocated or assigned to partition P2.

The memory resources of system 400 may also be partitioned and allocated to the different partitions. For example, as depicted in FIG. 1, a memory portion 416 of volatile memory 404 is allocated to partition P1 and a memory portion 418 of memory 404 is allocated to partition P2. In a similar manner, a memory portion 420 of non-volatile memory 406 is allocated to partition P1 and a memory portion 422 of non-volatile memory 406 is allocated to partition P2. In this manner, each partition has its own secure and private memory area that is accessible only to that partition.

I/O devices 408 and hardware resources 410 may also be partitioned between partitions P1 and P2. A hardware resource or an I/O device may be assigned exclusively to one partition or alternatively may be shared between multiple partitions. For example, in one embodiment, a private Ethernet interface may be assigned to each partition, while access to PCIe may be shared between the partitions.

Although not shown in FIG. 4, a portions of volatile memory 404 and of non-volatile memory 406 may also be configured as a sharable resources that are capable of being shared between multiple partitions. The shared memory resources may be used for multiple purposes including messaging between the partitions.

The memory resources assigned to a partition may store, during runtime, an operating system for the partition and data related to one or more entities executed by the partition. The data may include code or programs or instructions that are executed by the processing resources of the computing domain and other data. The entities executed by a computing domain may include, without restriction, an application, a process, a thread, an operating system, a device driver, and the like. For example, in the embodiment depicted in FIG. 4, memory 416 allocated to partition P1 may store an operating system OS1 424 and memory 418 allocated to partition P2 may store an operating system OS2 426. The operating system executed by one partition may be the same as or different from the operating system executed by another partition. For example, in FIG. 4, operating system OS1 of P1 may be the same as OS2 of P2, OS1 may be a completely different operating system than OS2 (e.g., OS1 may be Linux while OS2 may be Windows), or OS1 and OS2 may be different instances or versions of the same operating system (e.g., OS1 may be LinuxV1 while OS2 may be LinuxV2). Operating systems for the partitions are also commonly referred to as guest operating systems.

In some embodiments, each partition may be presented as a virtual machine executed by system 400. A software program like a hypervisor 428 may be executed by system 400 to facilitate creation and management of virtual machines. Hypervisor 428 facilitates secure partitioning of resources between the partitions of system 400 and management of the partitions. Each virtual machine can run its own operating system and this enables system 400 to run multiple operating systems concurrently. In one embodiment, hypervisor 428 presents a virtual machine to each partition and allocates resources to the partitions. For example, the allocation of memory, processing, and hardware resources, as described above, may be facilitated by hypervisor 428. In one embodiment, hypervisor 428 may run on processor 402 as an operating system control. Each virtual machine for a partition can operate independently of the other virtual machines and can operate as an independent virtual system.

In certain embodiments, hypervisor 428 may be configured to determine and set up the partitions based upon configuration information specified by a user or administrator of the system. The hypervisor may then create virtual machines for the partitions and allocate resources as defined by the configuration data.

In some embodiments, the multiple computing domains or partitions of system 400 can be configured to operate according to the active-standby model such that, during normal operations, one partition 100 operates in active mode while another partition operates in standby mode. For example, in the embodiment depicted in FIG. 4, partition P1 may operate in active mode and partition P2 may concurrently operate in standby mode. The partition operating in active mode (the active partition) may take over and manage the hardware resources and I/O devices of system 100 and perform a set of functions that are not performed by the standby partition. When a failover occurs, the standby partition becomes the active partition and takes over performance of the set of functions performed in active mode. As a result, the set of functions continue to be performed with minimal, if any, interruption. The previous active partition may become the standby partition after a failover. In this manner, a system 400 comprising a single physical processor 402 is capable of supporting the active-standby model. An example of a system with a single multicore processor providing active-standby functionality is described in U.S. Pat. No. 8,495,418, whose entire contents are incorporated herein by reference for all purposes.

There are different ways in which resources of system 400 can be allocated to the various partitions. For example, with respect to processing resources, in the configuration depicted in FIG. 4, cores C1 and C2 are allocated to partition P1 and cores C3 and C4 are allocated to partition P2. In this configuration, the cores allocated to active partition P1 do not overlap with the cores allocated to standby partition P2. However, in alternative embodiments, a core may be added or removed from a partition depending upon whether the partition is operating in active mode or in standby mode. For example, in one embodiment, system 400 depicted in FIG. 4 may be configured such that three of the four cores of processor 402 are allocated to the active partition and the standby partition is allocated only one core. In such an embodiment, when partition P1 is operating in active mode, it may be allocated cores C1, C2, and C3, with core C4 being allocated to standby partition P2. When partition P2 becomes the active partition in response to a failover event or after a race to gain mastership, cores C2 and C3, which were initially allocated to P1, may be reallocated to partition P2. Accordingly, when partition P2 becomes the active partition it is allocated cores C2, C3, and C4 and core C1 remains allocated to standby partition P1. This dynamic allocation of cores to the active partition may be needed, for example, in situations where, due to the processing resources required by functions executed by the active partition, the cores allocated to a partition in standby mode are not sufficient when the standby partition becomes the active partition. Various other core allocation techniques may be used in alternative embodiments.

Upon the occurrence of an event that triggers a race to gain mastership, the partitions compete with each other to determine who will become the active partition. This race to gain mastership can be biased in favor of a particular partition. In this respect, each partition can execute arbitration logic that performs the processing depicted in FIG. 2 (or FIG. 3) and described above. For example, partition P1 may execute arbitration logic 430 when the partition is booted. Likewise, partition P2 may execute arbitration logic 432 when it is booted. The arbitration logic executed by a partition may perform the processing depicted in flowcharts 200 or 300.

Information related to the mode of operation of P1 prior to the event triggering the race to gain mastership may be stored as mode information 434 in non-volatile memory 420 allocated to P1. Likewise, information related to the mode of operation of P2 prior to the event triggering the race to gain mastership may be stored as mode information 436 in non-volatile memory 422 allocated to P2. In some embodiments, the information may be stored only by the partition operating in a specific mode, for example, by the partition operating in active mode prior to occurrence of the event that triggered the race to gain mastership. Each partition may use the mode information stored in its non-volatile memory to determine its mode of operation prior to the occurrence of the event triggering the race to gain mastership and take appropriate actions per flowcharts 200 or 300 depicted in FIGS. 2 and 3 respectively. Further, in some embodiments, FPGA 412 may comprise a register storing a mastership bit 438 that is "set" when a partition wins the race to gain mastership and becomes the active partition. The partitions may use this bit to determine if the other partition has won the race to gain mastership and started to operate as the active partition per the processing in flowcharts 200 or 300.

Accordingly, for system 400 depicted in FIG. 4, the race to gain mastership can be intentionally biased in favor of a particular partition for a period of time. If a particular partition (e.g., the active partition prior to the occurrence of the mastership race triggering event) towards which the race is biased is unable to become the active partition within that particular time period, the biasing is removed and the race is then opened to all the competing partitions. This time limited biasing provides a recovery mechanism to cover the scenario where the partition towards which the race is biased has some problems and cannot become the active partition. In this scenario, the other partition is provided the opportunity to become the active partition.

The teachings described above can be embodied in several different systems and devices including, but not restricted to, network devices such as routers and switches that are configured to facilitate forwarding and routing of data, such as the forwarding and routing of data packets according to one or more network protocols. Network devices can be provided in various configurations including chassis-based devices and "pizza box" configurations. A "pizza box" configuration generally refers to a network device comprising a single physical multicore CPU as depicted in FIG. 4, where the single CPU is configured to handle both management and data-forwarding functions. In a "pizza box" embodiment, the CPU may be partitioned into multiple partitions as described above with respect to FIG. 4 and the partitions configured to operate according to the active-standby model. Upon the occurrence of an event that triggers a race to gain mastership between the partitions, each partition may perform processing, as described above, that, for a specific period of time, biases the race to gain mastership in favor of a particular partition, for example, in favor of the partition that operated in active mode prior to the occurrence of the event that triggered the race to gain mastership. Further, the biasing is time-limited such that if a particular partition towards which the race is biased is unable to become the active partition within that particular time period, the biasing is removed and the race is then opened to all the competing partitions.

Figure 5:
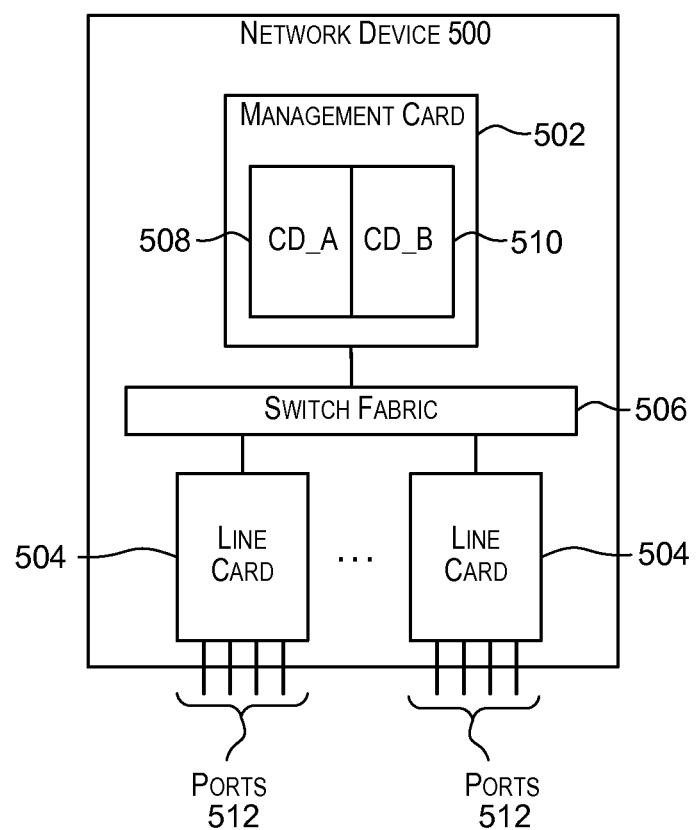
FIG. 5 depicts a simplified block diagram of a network device that may incorporate an embodiment of the present invention.

FIGS. 5, 6, 7, and 8 depict examples of chassis-based network devices that may incorporate the biasing techniques described above according to embodiments of the present invention. FIG. 5 depicts a simplified block diagram of a network device 500 that may incorporate an embodiment of the present invention. Network device 500 depicted in FIG. 5 is meant for illustrative purposes only and is not intended to be limiting in any manner. One of ordinary skill in the art would recognize many variations, alternatives, and modifications.

In the embodiment depicted in FIG. 5, network device 500 comprises one or more ports 512 for receiving and forwarding data packets and multiple cards that are configured to perform processing to facilitate forwarding of the data packets to their intended destinations. The multiple cards may include one or more line cards 504 and a management card 502. In one embodiment, a card, sometimes also referred to as a blade or module, can be inserted into one of multiple slots on a chassis of network device 500. This modular design allows for flexible configurations with different combinations of cards in the various slots of the device according to differing network topologies and switching requirements.

Ports 512 represent the I/O plane for network device 500. Network device 500 is configured to receive and forward packets using ports 512. A port within ports 512 may be classified as an input port or an output port depending upon whether network device 500 receives or transmits a data packet using the port. A port over which a data packet is received by network device 500 is referred to as an input port. A port used for communicating or forwarding a data packet from network device 500 is referred to as an output port. A particular port may function both as an input port and an output port. A port may be connected by a link or interface to a neighboring network device or network. Ports 512 may be capable of receiving and/or transmitting different types of data traffic at different speeds including 1 Gigabit/sec, 10 Gigabits/sec, 100 Gigabits/sec, or even more. In some embodiments, multiple ports of network device 500 may be logically grouped into one or more trunks.

Upon receiving a data packet via an input port, network device 500 is configured to determine an output port to be used for transmitting the data packet from the network device to facilitate communication of the packet to its intended destination. Within network device 500, the packet is then forwarded from the input port to the determined output port and then transmitted from network device 500 using the output port. In certain embodiments, forwarding of packets from an input port to an output port is performed by one or more line cards 504 with possible assistance from management card 502. Line cards 504 represent the data forwarding plane of network device 500. Each line card may be coupled to one or more ports 512 and comprise one or more packet processors that are programmed to perform processing related to determining an output port for the packets and for forwarding the data packets from an input port to the output port. In one embodiment, processing performed by a line card 504 may comprise extracting information from a received packet (e.g., extracting packet header information), performing lookups using the extracted information to determine an output port for the packet such that the packet can be forwarded to its intended destination, forwarding the packet to the output port, and then forwarding the packet from network device 500 via the output port.

Management card 502 is configured to perform management and control functions for network device 500 and represents the management plane for network device 500. In certain embodiments, management card 502 is communicatively coupled to line cards 504 via switch fabric 506. Switch fabric 506 provides a mechanism for enabling communications and forwarding of data between management card 502 and line cards 504, and between line cards 504. As depicted in FIG. 5, in some embodiments, management card 502 may provide for multiple computing domains such as CD_A 508 and CD_B 510. Each computing domain may be allocated processing and memory resources. The processing resources allocated to a computing domain can include one or more processing units, where a processing unit can be a processor or a core of a multicore processor. Accordingly, the processing resources allocated to CD_A 508 and/or CD_B 510 can include a single processor, a single core, multiple processors, multiple cores, or various combinations of cores and processors. In some embodiments, management card 502 can comprise a single physical multicore processor and CD_A 508 and CD_B 510 may be allocated one or more cores of the multicore processor.

In some embodiments, the computing domains of network device 500 may be configured to operate according to the active-standby model. For example, one of the computing domains may be configured to operate in active mode and perform a set of management-related functions while the other computing domain operates in standby mode in which the management-related functions are not performed. The management-related functions performed in active mode may include, for example, maintaining routing tables, programming line cards 504 (e.g., downloading information to a line card that enables the line card to perform data forwarding functions), some data forwarding functions, running various management protocols, and the like. When a failover occurs, the standby computing domain becomes the active computing domain and takes over performance of the set of functions performed in active mode. The previous active computing domain may become the standby computing domain after a failover.

Upon the occurrence of an event that triggers a race to gain mastership on management card 502, the two computing domains of management card 502 compete with each other to become the active computing domain. In certain embodiments, when such a race to gain mastership is triggered between the computing domains on management card 502, each computing domain may perform processing, as described above, that, for a specific period of time, biases the race to gain mastership in favor of a particular computing domain, for example, in favor of the computing domain that operated in active mode prior to the occurrence of the event that triggered the race to gain mastership, as described above. Further, the biasing is time-limited such that if a particular computing domain towards which the race is biased is unable to become the active computing domain within that particular time period, the biasing is removed and the race is then opened to all the competing computing domains.

Figure 6:
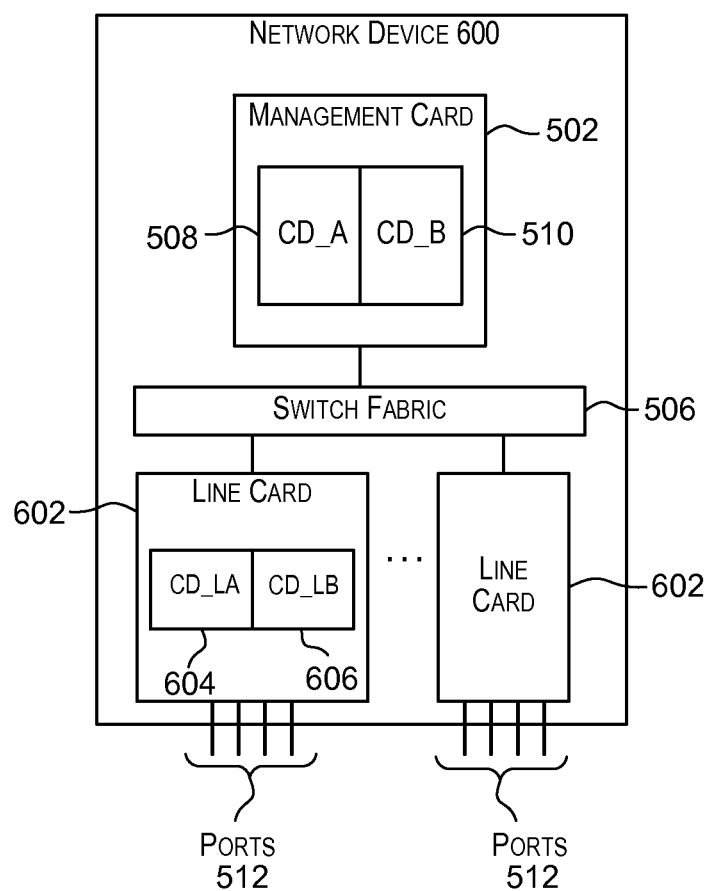
FIG. 6 depicts a network device according to an embodiment in which a line card provides multiple computing domains.

FIG. 6 depicts a network device 600 according to an embodiment in which a line card provides multiple computing domains. Network device 600 depicted in FIG. 6 is meant for illustrative purposes only and is not intended to be limiting in any manner. One of ordinary skill in the art would recognize many variations, alternatives, and modifications.

Network device 600 has similarities with network device 500 depicted in FIG. 5 in terms of management card 502, computing domains 508 and 510 provided by the management card, switch fabric 506 and ports 512. Switch fabric 506 provides a mechanism for enabling communications and forwarding of data between management card 502 and line cards 602, and between line cards 602. In network device 600, line card 602 provides for multiple computing domains CD_LA 604 and CD_LB 606 that may be configured to operate according to the active-standby model at the data forwarding level. Each computing domain on line card 602 may be allocated processing and memory resources. The processing resources allocated to a computing domain can include one or more processing units, where a processing unit can be a processor or a core of a multicore processor. The processing resources allocated to CD_LA 604 and/or CD_LB 606 can include a single processor, a single core, multiple processors, multiple cores, or various combinations of cores and processors. In some embodiments, line card 602 may comprise a single physical multicore processor and CD_LA 604 and CD_LB 606 may be allocated one or more cores of the multicore processor.

In certain embodiments, the computing domains on line card 602 may be configured to operate according active-standby model in which one of the computing domains operates in active mode and performs a set of data forwarding-related functions while the other computing domain operates in standby mode in which the data forwarding-related functions are not performed. The data forwarding-related functions performed in active mode may include, for example, extracting header information from packets, determining output ports for packets, forwarding the packets to the output ports, receiving forwarding information from management card 502 and programming forwarding hardware based upon the received information, running data forwarding networking protocols, managing I/O devices, managing control state, sending out control packets, maintaining protocol/state information (e.g., application data (routing tables, queue structures, buffers, etc.) and hardware specific state information (ASIC configuration tables, port maps, etc.)), maintaining timing information/logs, and the like. When a failover occurs, the standby computing domain becomes the active computing domain and takes over performance of the set of data forwarding-related functions performed in active mode. Resources previously owned by the active computing domain are taken over by the standby computing domain when it becomes active. The resources can be hardware resources (PCIe devices, memory, CPU cores, device ports, etc.) and software related resources (e.g., message queues, buffers, interrupts, etc.). The previous active computing domain may become the standby computing domain after a failover.

Upon the occurrence of an event that triggers a race to gain mastership on a line card 602, the two computing domains of line card 602 compete with each other to become the active computing domain. In certain embodiments, when such a race to gain mastership is triggered between the computing domains on line card 602, each computing domain may perform processing, as described above, that, for a specific period of time, biases the race to gain mastership in favor of a particular computing domain, for example, in favor of the computing domain that operated in active mode prior to the occurrence of the event that triggered the race to gain mastership, as described above. Further, the biasing is time-limited such that if a particular computing domain towards which the race is biased is unable to become the active computing domain within that particular time period, the biasing is removed and the race is then opened to all the competing computing domains.

Figure 7:
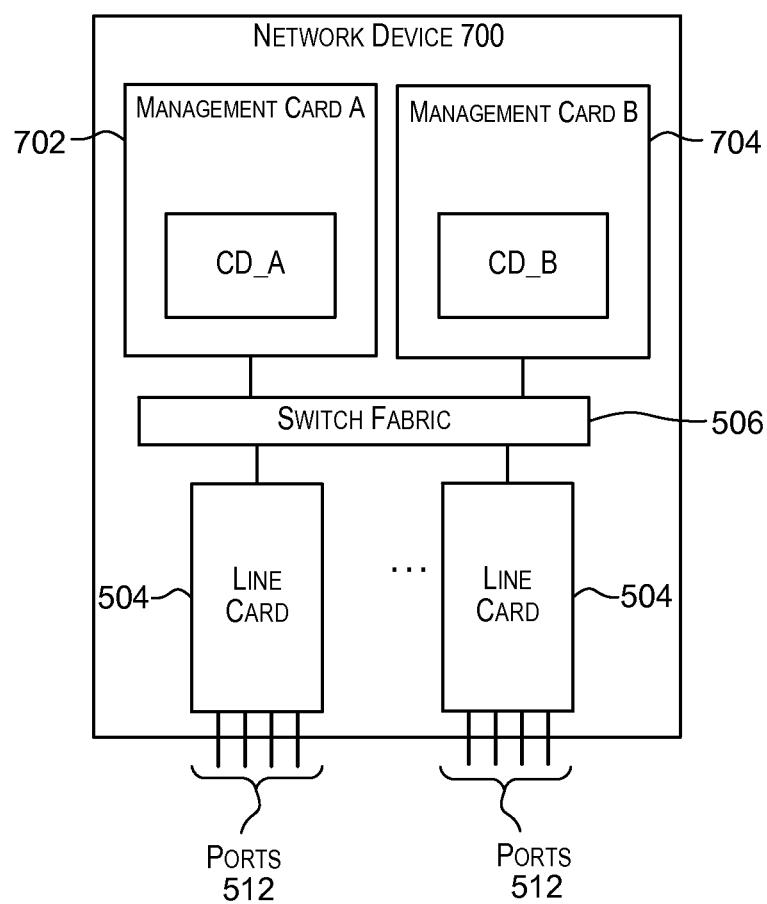
FIG. 7 depicts a network device according to an embodiment in which multiple management cards are provided, each management card corresponding to a computing domain.

FIG. 7 depicts a network device 700 according to an embodiment in which multiple management cards are provided, each management card corresponding to a computing domain. Network device 700 depicted in FIG. 7 is meant for illustrative purposes only and is not intended to be limiting in any manner. One of ordinary skill in the art would recognize many variations, alternatives, and modifications.

As depicted in FIG. 7, network device 700 comprises two management cards 702 and 704, each management card representing a computing domain. Accordingly, in conjunction, the two management cards provide for multiple computing domains that can be configured to operate according to the active-standby model. Switch fabric 506 provides a mechanism for enabling communications and forwarding of data between management cards 702 and 704, between a management card and a line card, and between line cards 504.

When configured to operate according to the active-standby model, one of the management cards is configured to operate in active mode and perform management-related functions while the other management card operates in standby mode in which the management-related functions are not performed. When a failover occurs, the standby management card becomes the active management card and takes over performance of the set of management-related functions performed in active mode. The active management card prior to the failover may become the standby after the failover.

Upon the occurrence of an event that triggers a race to gain mastership, the two management cards compete with each other to become the active management card. In certain embodiments, when such a race to gain mastership is triggered between the management cards, each management card may perform processing that, for a specific period of time, biases the race to gain mastership in favor of a particular management card, for example, in favor of the management card that operated in active mode prior to the occurrence of the event that triggered the race to gain mastership. Further, the biasing is time-limited such that if a particular management card towards which the race is biased is unable to become the active management card within that particular time period, the biasing is removed and the race is then opened to both the competing management cards.

Figure 8:
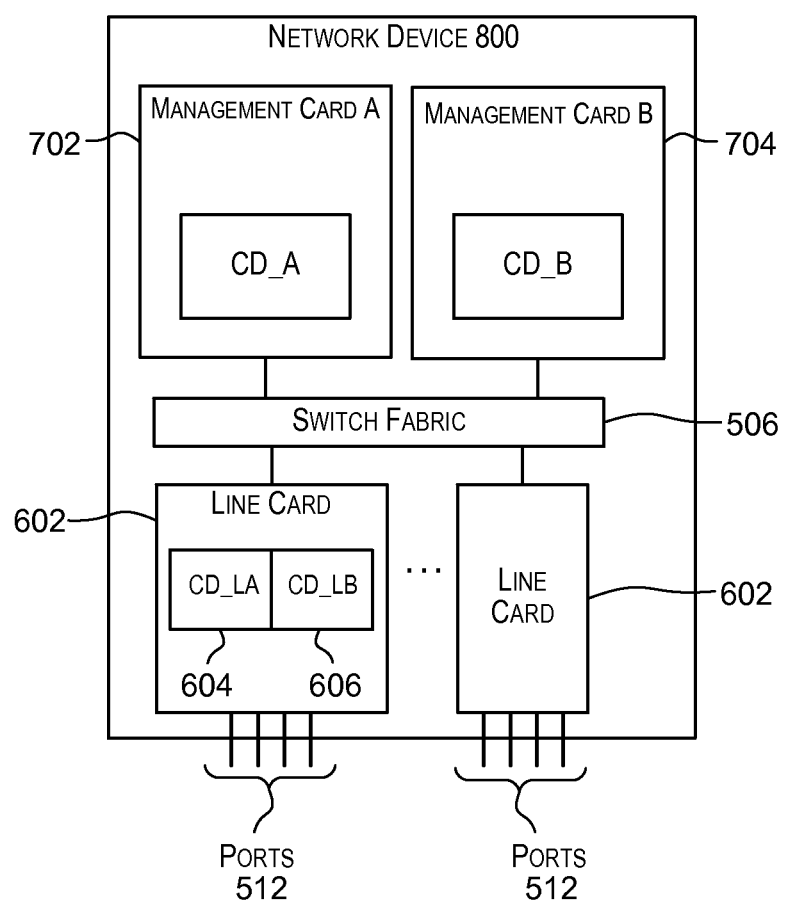
FIG. 8 depicts a network device according to an embodiment in which multiple management cards are provided, each management card corresponding to a computing domain, and further multiple computing domains are presented at the line card level.

FIG. 8 depicts a network device 800 according to an embodiment in which multiple management cards are provided, each management card corresponding to a computing domain, and further multiple computing domains are presented at the line card level. The embodiment depicted in FIG. 8 is a combination of the management cards configuration depicted in FIG. 7 and the line cards configuration depicted in FIG. 6. Network device 800 depicted in FIG. 8 is meant for illustrative purposes only and is not intended to be limiting in any manner. One of ordinary skill in the art would recognize many variations, alternatives, and modifications.

As depicted in FIG. 8, network device 800 comprises two management cards 702 and 704, each management card representing a computing domain. Accordingly, in conjunction, the two management cards provide for multiple computing domains that can be configured to operate according to the active-standby model such that, during normal operations of network device 800, one of the management cards operates in active mode and performs management-related functions while the other management card operates in standby mode in which the management-related functions are not performed. When a failover occurs, the standby management card becomes the active management card and takes over performance of the set of management-related functions performed in active mode. The active management card prior to the failover may become the standby after the failover.

Additionally, line card 602 also comprises two computing domains 604 and 606 that can be configured to operate according to the active-standby model such that, during normal operations of network device 800, one of the computing domains operates in active mode and performs data forwarding-related functions while the other computing domain operates in standby mode in which the data forwarding-related functions are not performed. When a failover occurs, the standby computing domain becomes the active computing domain on the line card and takes over performance of the set of data forwarding-related functions performed in active mode. The active computing domain on the line card prior to the failover may become the standby after the failover. Switch fabric 506 provides a mechanism for enabling communications and forwarding of data between management cards 702 and 704, between a management card and a line card, and between line cards 602.

In certain embodiments, the occurrence of an event may trigger a race to gain mastership both at the management cards level and at the line card level. Alternatively, an event may trigger a race to gain mastership only at the management cards level or only at the line card level. When such a race to gain mastership is triggered between the management cards, each management card may perform processing that, for a specific period of time, biases the race to gain mastership in favor of a particular management card, for example, in favor of the management card that operated in active mode prior to the occurrence of the event that triggered the race to gain mastership. Likewise, when a race to gain mastership is triggered between computing domains on a line card, each computing domain may perform processing that, for a specific period of time, biases the race to gain mastership in favor of a particular computing domain, for example, in favor of the computing domain that operated in active mode prior to the occurrence of the event that triggered the race to gain mastership. Further, both at the management cards level and at the line card level, the biasing is time-limited such that if a particular management card or computing domain on a line card towards which the race is biased is unable to become the active management card or the active computing domain within that particular time period, the biasing is removed and the race is then opened to both the competing management cards or computing domains on the line card.

Although specific embodiments have been described, these are not intended to be limiting. Various modifications, alterations, alternative constructions, and equivalents are also encompassed within the scope of the invention. The embodiments are not restricted to operation within certain specific data processing environments, but are free to operate within a plurality of data processing environments. Additionally, although certain embodiments have been described using a particular series of transactions and steps, it should be apparent to those skilled in the art that the scope is not limited to the described series of transactions and steps.

Further, while certain embodiments have been described using a particular combination of hardware and software, it should be recognized that other combinations of hardware and software are also within the scope of the present invention. Embodiments may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method comprising:
   upon the occurrence of an event that causes a race between a first domain in a computing system and a second domain in the computing system to start operating in a first mode, determining that the first computing domain did not operate in the first mode prior to occurrence of the event; and
   upon determining that the first computing domain did not operate in the first mode prior to the occurrence of the event:
      refraining, for a period of time, the first computing domain from attempting to start operating in the first mode;
      allowing, during the period of time, the second computing domain to attempt to start operating in the first mode; and
   after the period of time has passed:
      determining, by the first computing domain, whether the second computing domain is operating in the first mode;
      upon determining that the second computing domain is not operating in the first mode, allowing the first computing domain to attempt to operate in the first mode; and
      upon determining that the second computing domain is operating in the first mode, causing the first computing domain to operate in a second mode different from the first mode.

2. The method of claim 1 wherein a set of functions is performed when operating in the first mode and not performed when operating in the second mode.

3. The method of claim 1 wherein a set of functions is performed when operating in the second mode and is not performed when operating in the first mode.

4. The method of claim 1 wherein the refraining comprises calculating the period of time.

5. The method of claim 1 wherein determining that the first computing domain did not operate in the first mode prior to the occurrence of the event comprises:
   reading, by the first computing domain, information from a non-volatile memory, wherein the information is stored in the non-volatile memory prior to the occurrence of the event; and
   determining, by the first computing domain, that the first computing domain did not operate in the first mode prior to the occurrence of the event based upon the information read from the non-volatile memory.

6. The method of claim 1 wherein the determining, by the first computing domain, whether the second computing domain is operating in the first mode comprises:
   reading information from a memory location, the memory location being readable and writable by the first computing domain and the second computing domain; and
   determining, based upon the information read from the memory location, whether the second computing domain is operating in the first mode.

7. The method of claim 1 wherein:
   a first set of one or more processing units is allocated to the first computing domain; and
   a second set of one or more processing units is allocated to the second computing domain;
   wherein the first set of processing units includes a first core from a multicore processor; and
   wherein the second set of processing units includes a second core from the multicore processor.

8. A system comprising:
   a first computing domain comprising at least a first processing unit, wherein the first processing unit is a processor or a processing core; and
   a second computing domain comprising at least a second processing wherein the second processing unit is a processor or a processing core;
   wherein the first computing domain is configured to:
      upon the occurrence of an event that causes a race between the first computing domain and the second computing domain to operate in a first mode, determine that the first computing domain did not operate in the first mode prior to occurrence of the event;
      refrain from attempting to start operating in the first mode for a period of time;

after the period of time has passed:
  determine whether the second computing domain is operating in the first mode;
  upon determining that the second computing domain is not operating in the first mode, attempt to operate in the first mode; and
  upon determining that the second computing domain is operating in the first mode, start to operate in a second mode different from the first mode; and
wherein the second computing domain is configured to, while the first computing domain is refrained from attempting to start operating in the first mode for the period of time, attempt to start operating in the first mode.

9. The system of claim 8 wherein a set of functions is performed when operating in the first mode and not performed when operating in the second mode.

10. The system of claim 8 wherein a set of functions is performed when operating in the second mode and is not performed when operating in the first mode.

11. The system of claim 8 wherein the first computing domain is configured to:
  read, from a non-volatile memory, information stored in the non-volatile memory prior to the occurrence of the event; and
  determine, based upon the read information, that the first computing domain did not operate in the first mode prior to the occurrence of the event.

12. The system of claim 8 wherein the first computing domain is configured to:
  read information from a memory location, the memory location being readable and writable by the first computing domain and the second computing domain; and
  determine, based upon the information read from the memory location, whether the second computing domain is operating in the first mode.

13. The system of claim 8 wherein:
  a first set of one or more processing units is allocated to the first computing domain, the first set of processing units including a first core from a multicore processor; and
  a second set of one or more processing units is allocated to the second computing domain, the second set of processing units including a second core from the multicore processor.

14. A network device comprising:
  a set of one or more ports for forwarding one or more data packets from the network device;
  a plurality of processing units;
  a first computing domain, the first computing domain being allocated a first set of one or more processing units from the plurality of processing units;
  a second computing domain, the second computing domain being allocated a second set of one or more processing units from the plurality of processing units;
  wherein, in response to the occurrence of an event that causes a race between the first computing domain and the second computing domain to operate in a first mode, the first computing domain is configured to determine that the first computing domain did not operate in the first mode prior to the occurrence of the event;
  wherein the first computing domain is configured to refrain from attempting to start operating in the first mode for a period of time;
  wherein, in response to the occurrence of the event, the second computing domain is configured to attempt to start operating in the first mode during the period of time;
  wherein, after the period of time has passed, the first computing domain is configured to:
    if the second computing domain is operating in the first mode, start to operate in a second mode different from the first mode; and
    if the second computing domain is not operating in the first mode, attempt to operate in the first mode.

15. The network device of claim 14 wherein a set of functions is performed by the first computing domain or the second computing domain when operating in the first mode and not performed when operating in the second mode.

16. The network device of claim 14 wherein a set of functions is performed when operating in the second mode and is not performed when operating in the first mode.

17. The network device of claim 14 wherein the first computing domain is configured to, based upon information stored prior to the occurrence of the event, determine whether the first computing domain operated in the first mode prior to the occurrence of the event.

18. The network device of claim 14 wherein:
  the first set of processing units includes a first core from a multicore processor; and
  the second set of processing units includes a second core from the multicore processor.

19. The network device of claim 14 wherein:
  the first computing domain corresponds to a first card of the network device; and
  the second computing domain corresponds to a second card of the network device.

20. The network device of claim 14 wherein the first computing domain and the second computing domain are located on a card of the network device.

21. An apparatus comprising:
  upon the occurrence of an event that causes a race between a first domain in a computing system and a second domain the computing system to operate in a first mode, means for determining that the first computing domain did not operate in the first mode prior to the occurrence of the event;
  means for refraining, by the first computing domain, for a period of time, from attempting to start operating in the first mode; and
  means for allowing, during the period of time, the second computing domain to attempt to start operating in the first mode; and
  after the period of time has passed:
    means for determining, by the first computing domain, whether the second computing domain is operating in the first mode;
    upon determining that the second computing domain is not operating in the first mode, means for allowing the first computing domain to attempt to operate in the first mode; and
    upon determining that the second computing domain is operating in the first mode, means for causing the first computing domain to operate in a second mode different from the first mode.

* * * * *